(12) United States Patent
Hamlaoui et al.

(10) Patent No.: US 12,442,718 B2
(45) Date of Patent: Oct. 14, 2025

(54) METHOD AND SYSTEM FOR RETRIEVING AN OPTICAL PARAMETER OF AN OPHTHALMIC LENS

(71) Applicant: Essilor International, Charenton-le-Pont (FR)

(72) Inventors: Samy Hamlaoui, Charenton-le-Pont (FR); Florian Caleff, Charenton-le-Pont (FR); Stephane Gueu, Charenton-le-Pont (FR); Arnaud Susset, Saint-Maur-des-Fosses (FR); Fabien Muradore, Charenton-le-Pont (FR); Ning Wang, Shanghai (CN)

(73) Assignee: Essilor International, Charenton-le-Pont (FR)

( * ) Notice: Subject to any disclaimer, the term of this patent is extended or adjusted under 35 U.S.C. 154(b) by 194 days.

(21) Appl. No.: 17/790,221

(22) PCT Filed: Jan. 8, 2021

(86) PCT No.: PCT/EP2021/050278
§ 371 (c)(1),
(2) Date: Jun. 30, 2022

(87) PCT Pub. No.: WO2021/140204
PCT Pub. Date: Jul. 15, 2021

(65) Prior Publication Data
US 2023/0077639 A1    Mar. 16, 2023

(30) Foreign Application Priority Data
Jan. 9, 2020 (EP) ................................ 20305009

(51) Int. Cl.
*G01M 11/02* (2006.01)

(52) U.S. Cl.
CPC .... *G01M 11/0228* (2013.01); *G01M 11/0221* (2013.01); *G01M 11/0235* (2013.01); *G01M 11/0257* (2013.01); *G01M 11/0264* (2013.01)

(58) Field of Classification Search
CPC ......... G01M 11/0228; G01M 11/0235; G01M 11/0221; G01M 11/025; G01M 11/0257; G01M 11/0264; G01B 11/255
See application file for complete search history.

(56) References Cited

U.S. PATENT DOCUMENTS

| | | | |
|---|---|---|---|
| 10,321,820 B1 * | 6/2019 | Gollier | G02B 27/0172 |
| 2012/0236157 A1 * | 9/2012 | Askey | H04N 17/002 |
| | | | 348/187 |

(Continued)

FOREIGN PATENT DOCUMENTS

| | | |
|---|---|---|
| CN | 107850511 A | 3/2018 |
| WO | WO 2017/134275 A1 | 8/2017 |

OTHER PUBLICATIONS

International Search report issued Mar. 25, 2021 in PCT/EP2021/050278, filed on Jan. 8, 2021, 3 pages.

(Continued)

*Primary Examiner* — Kara E. Geisel
*Assistant Examiner* — Jonathon Cook
(74) *Attorney, Agent, or Firm* — Oblon, McClelland, Maier &Neustadt, L.L.P.

(57) ABSTRACT

This method for retrieving at least one optical parameter of an ophthalmic lens comprises: obtaining an image of a first and second patterns by using an image capture device located at a first position; from that image, obtaining a first set of data from at least a part of the first pattern that is seen through the lens by the image capture device and obtaining a second set of data from at least a part of the second pattern that is seen directly i.e. outside the lens by the image capture device; retrieving the at least one optical parameter by using (Continued)

the first and second sets of data and taking account of relative positions of the image capture device, the lens and the first and second patterns.

14 Claims, 12 Drawing Sheets

(56) References Cited

U.S. PATENT DOCUMENTS

| | | | |
|---|---|---|---|
| 2017/0336284 A1 | 11/2017 | Goldberg et al. | |
| 2018/0038768 A1* | 2/2018 | Hofmann | G01M 11/0264 |
| 2018/0106700 A1* | 4/2018 | Limon | G01M 11/0228 |
| 2018/0224675 A1* | 8/2018 | Gueu | G02C 13/003 |
| 2018/0306670 A1* | 10/2018 | Goldberg | G01M 11/0242 |
| 2019/0049335 A1 | 2/2019 | Goldberg et al. | |
| 2019/0072455 A1* | 3/2019 | Limon | G01M 11/0221 |
| 2019/0265517 A1* | 8/2019 | Bonnin | G02C 13/005 |
| 2019/0391040 A2* | 12/2019 | Gamliel | G01M 11/025 |
| 2020/0124496 A1 | 4/2020 | Goldberg et al. | |
| 2021/0208024 A1* | 7/2021 | Hubacz | A61B 3/0091 |

OTHER PUBLICATIONS

Extended European Search Report issued Oct. 13, 2020 in European Application 20305009.1, filed on Jan. 9, 2020, 8 pages.
Office Action dated Feb. 18, 2025, issued in counterpart CN Application No. 202180007816.5, w/English Translation. (21 pages).

* cited by examiner

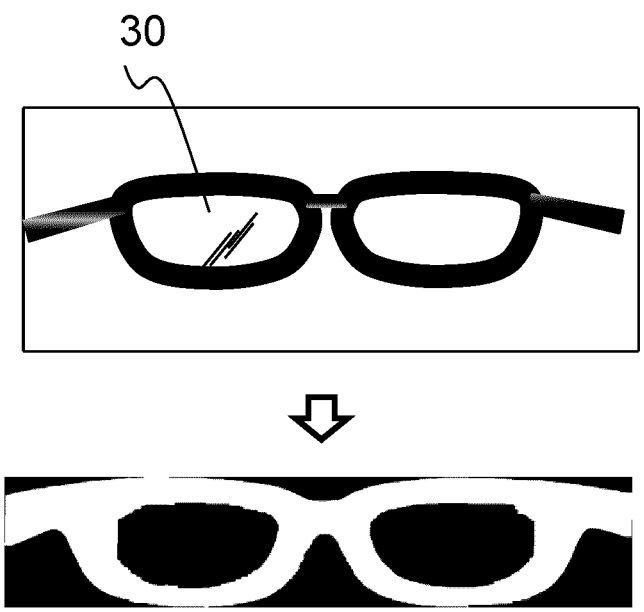
FIG.16
FIG.17
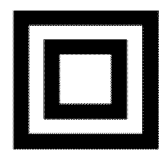
FIG.18
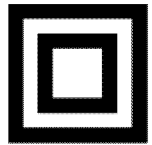

METHOD AND SYSTEM FOR RETRIEVING AN OPTICAL PARAMETER OF AN OPHTHALMIC LENS

FIELD OF THE INVENTION

The present disclosure relates to a method and system for retrieving at least one optical parameter of an ophthalmic lens.

BACKGROUND OF THE INVENTION

In order to be able to duplicate an ophthalmic lens, it is necessary to know the optical parameters defining the correction applied by the lens, and in particular the lens power.

To that end, automatic lens meters are known.

However, such ophthalmic instruments are mainly used by optometrists or opticians for example, i.e. eye care professionals. Indeed, they require skills to carry out measurements at the right position of the lens, they are more or less expensive, they include specific hardware and their robustness is not optimized for use by anybody. Consequently, such instruments are neither dedicated to low-skilled eye care professionals (also referred to as ECP), nor to consumers for "do-it-yourself" measurements.

SUMMARY OF THE INVENTION

An object of the disclosure is to overcome the above-mentioned drawbacks of the prior art.

To that end, the disclosure provides a method for retrieving at least one optical parameter of an ophthalmic lens, wherein it comprises:
  obtaining an image of a first and a second pattern by using an image capture device located at a first position;
  from that image, obtaining a first set of data from at least a part of the first pattern that is seen by the image capture device through the lens;
  from that image, obtaining a second set of data from at least a part of the second pattern that is seen by the image capture device outside the lens;
  retrieving the at least one optical parameter by using the first and second sets of data and taking account of positions, with respect to each other, of the image capture device, the lens and the first and second patterns.

In the method according to the disclosure, the steps of obtaining the first and second sets of data and of retrieving the at least one optical parameter may be carried out automatically, so that, if the step of obtaining an image of the first and second patterns is to be carried out by a consumer or a low-skilled ECP, the only contribution of that consumer or low-skilled ECP will be to use an image capture device, which is much easier to do than using a lens meter.

In the method according to the disclosure, the steps of obtaining an image of the first and second patterns may be done semi-automatically, so that the usability and the accuracy/reproducibility are much higher.

Thus, the at least one optical parameter of the lens can be retrieved by means of a very simple input on the consumer's or low-skilled ECP's side.

Thus, the method according to the disclosure may be used for example for manufacturing a duplicate of an ophthalmic lens in a very simple and convenient manner for the consumer, without the need to spend time in an optician's shop.

The disclosure also provides a system for implementing a method for retrieving at least one parameter of an ophthalmic lens, wherein the method comprises:
  obtaining an image of a first and second patterns by using an image capture device located at a first position;
  from that image, obtaining a first set of data from at least a part of the first pattern that is seen by the image capture device through the lens;
  from that image, obtaining a second set of data from at least a part of the second pattern that is seen by the image capture device outside the lens;
  retrieving the at least one optical parameter by using the first and second sets of data and taking account of positions, with respect to each other, of the image capture device, the lens and the first and second patterns,
wherein the system comprises:
  at least one processor;
  a mobile device equipped with the image capture device; and
  a reflection device or a computer.

The disclosure further provides a computer program product comprising one or more sequences of instructions that are accessible to a processor and that, when executed by the processor, cause the processor to:
  obtain an image of a first and second patterns by using an image capture device located at a first position;
  from that image, obtain a first set of data from at least a part of the first pattern that is seen by the image capture device through the lens;
  from that image, obtain a second set of data from at least a part of the second pattern that is seen by the image capture device outside the lens;
  retrieve the at least one optical parameter by using the first and second sets of data and taking account of positions, with respect to each other, of the image capture device, the lens and the first and second patterns.

The disclosure further provides a non-transitory storage medium, wherein it stores one or more sequences of instructions that are accessible to a processor and that, when executed by the processor, cause the processor to:
  obtain an image of a first and second patterns by using an image capture device located at a first position;
  from that image, obtain a first set of data from at least a part of the first pattern that is seen by the image capture device through the lens;
  from that image, obtain a second set of data from at least a part of the second pattern that is seen by the image capture device outside the lens;
  retrieve the at least one optical parameter by using the first and second sets of data and taking account of positions, with respect to each other, of the image capture device, the lens and the first and second patterns.

As the advantages of the system, the computer program product and the non-transitory storage medium are similar to those of the method, they are not repeated here.

The system, the computer program product and the non-transitory storage medium are advantageously configured for executing the method in any of its execution modes.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIGS. 15 and 16 illustrate steps of the method according to the present disclosure, in an embodiment in which the lens is mounted on an eyeglasses frame.

FIG. 17 shows examples of patterns that may be used in the method according to the present disclosure.

FIG. 18 shows other examples of patterns that may be used in the method according to the present disclosure.

DETAILED DESCRIPTION OF THE INVENTION

Figure 1:
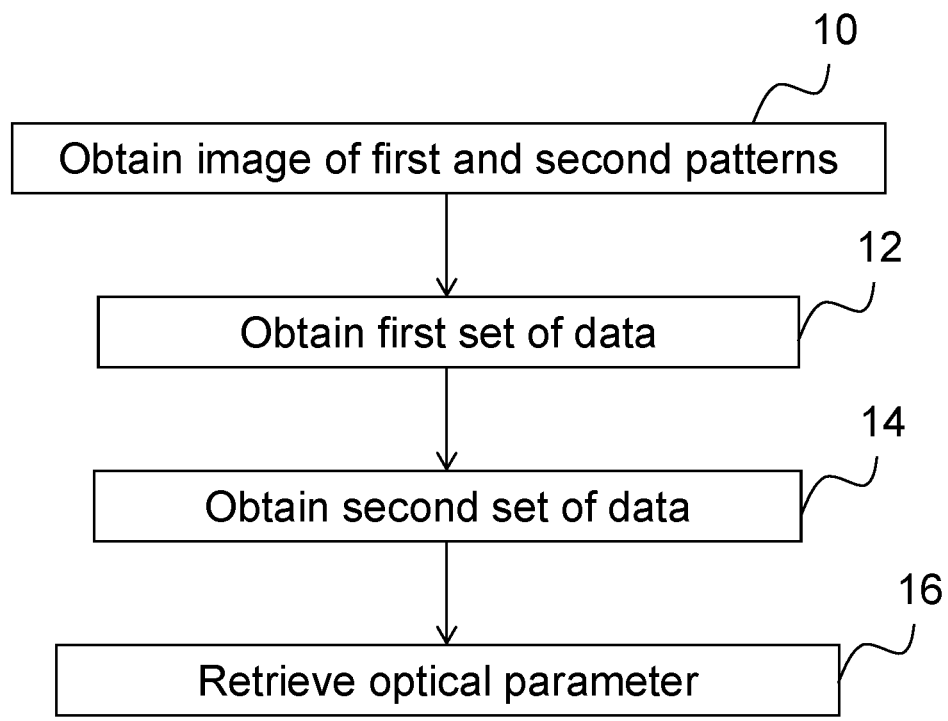
FIG. 1 is a flowchart showing steps of a method for retrieving at least one optical parameter of an ophthalmic lens according to the present disclosure, in a particular embodiment.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

An ophthalmic lens according to the present disclosure may be a spectacle lens, a contact lens, an instrument lens or any other kind of lens used in ophthalmology or optics. For instance, it may be a corrective lens having a power of the sphere, cylinder, axis, addition and/or prism type. The lens power can be defined as the inverse of the focal distance of the lens. The lens may be a single vision lens having a constant power, or it may be a progressive lens having variable power, or it may be a bi-focal or a tri-focal lens.

If the lens is a single vision lens, the power of the lens is the power at the optical center of the lens, i.e. the point of the lens where light is not deviated when it goes through the lens.

If the lens is a progressive lens, the focal distance varies all along the lens, including far vision, intermediate vision and near vision areas. The power of the progressive lens comprises the power at a far vision point, the power at a near vision point and the power distribution in the lens.

If the lens is a bi-focal (respectively tri-focal) lens, the focal distance varies between the two (respectively three) different areas of the lens. The power of the bi-focal or tri-focal lens comprises the power in each of those areas.

As shown in FIG. 1, in a particular embodiment, a method according to the disclosure, for retrieving at least one optical parameter of an ophthalmic lens, comprises a first step 10 of obtaining an image of a first and second patterns by using an image capture device located at a first position.

By way of non-limiting example, the at least one optical parameter may be the optical center or any of the optical parameters defining the power of the lens, i.e. any of the optical parameters contained in the prescription of the lens, namely, sphere and/or cylinder and/or axis and/or addition and/or prism.

Using an image capture device and a source pattern comprising a first and a second patterns, the general principle of the method according to the disclosure consists in getting to know the source pattern and the deformation of the source pattern seen through the lens and analyzing the data relating to the source pattern and its deformation to retrieve the at least one optical parameter of the lens.

The implementation of that principle involves at least one processor, which may be comprised in a fixed and/or mobile device, such as in a fixed or portable computer and/or in a smartphone and/or in the cloud.

The implementation also involves a fixed or mobile device equipped with the above-mentioned image capture device.

By way of non-limiting example, the mobile device may be a smartphone.

The image capture device may be comprised in the smartphone i.e. the smartphone may be equipped with a camera. As a variant, the image capture device may be a separated image capture device.

In addition to the at least one processor, the mobile device and the image capture device, various combinations or configurations of elements are possible, provided at least one of the elements is able to show or display or reflect patterns and at least one of the elements is able to capture images.

By way of non-limiting example, the mobile device may be combined either with a reflection device, such as a mirror, or with a non-portable or fixed or portable computer. It is to be noted that, in the present disclosure, the "portable computer" may be a laptop, or a tablet, or any other type of portable computer.

As to the source pattern, it may be a two-dimension (2D) or three-dimension (3D) source pattern, available as an object, or printed on a piece of paper, or displayed on a screen.

By way of non-limiting example, the source pattern may be a 3D gauge the dimensions of which are known, or a credit card, or a target printed on A4 paper, or a target the size of which is known in pixels, displayed on the screen of a computer, smartphone or tablet.

By way of non-limiting example, the image capture device may be a 2D camera or a 3D scanner, with or without other sensors embedded into it, such as a telemeter and/or a gyroscope: it may be a 2D camera of a smartphone or tablet, or a combination of a high definition 2D camera with a 3D sensor, such as for example one or more TOF (Time Of Flight) sensors (i.e. sensors emitting light towards the source pattern which then reflects it, the distance between the source pattern and the TOF sensor being deduced from the light travelling time) or structured-light sensors (i.e. sensors projecting fringes or other known patterns towards the source pattern the deformation of which is analyzed by the sensor). The image capture device may or may not comprise additional hardware, such as a holder.

The image capture device is located at a first position and captures an image of the first and second patterns.

Namely, the method according to the disclosure is based on the use of the source pattern, a part of which is seen by the image capture device through the lens (the first part) and another part of which is seen directly by the image capture device (the second part).

During the following steps 12 and 14, from the image of the first and second patterns obtained at step 10, a first set of data is obtained from the first pattern seen through the lens by the image capture device (step 12) and a second set of data is obtained from the second pattern seen outside the lens by the image capture device (step 14). Step 12 may be carried out before or after or at the same time as step 14.

Then, during step 16, by using the first and second data and taking into account, in a manner detailed hereafter, relative positions, i.e. positions with respect to each other, of the image capture device, the lens and the first and second patterns, the at least one optical parameter is retrieved, in a manner also detailed below.

Depending on the selected embodiment, relative positions of the image capture device, the lens and the first and second patterns, i.e. positions, with respect to each other, of the image capture device, the lens and the first and second patterns, may be obtained partially or totally by using the second set of data.

In a particular embodiment, a rough estimate and a refined estimate of the at least one optical parameter may be obtained, namely:
  a rough estimate of the at least one parameter may be obtained by using the first set of data and relative positions of the image capture device, the lens and the first and second patterns, i.e. positions, with respect to each other, of the image capture device, the lens and the first and second patterns; and
  a refined estimate of the at least one optical parameter may be obtained by:
  using the first set of data and relative positions of the image capture device, the lens and the first and second patterns, i.e. positions, with respect to each other, of the image capture device, the lens and the first and second patterns; and
  applying an optimization technique based on minimizing a cost function as described later in more detail, a value of the cost function being determined by using ray tracing.

In a particular embodiment where the lens 30 is mounted on a frame 140, the method may further comprise detecting a position, i.e. location and orientation, of the frame and deducing therefrom the cylinder axis of the lens in the coordinate system of the frame, rather than in the image capture device coordinate system.

There are several ways of detecting the frame.

In a particular embodiment, the detection of the frame may comprise obtaining a model of a frame from a database where a plurality of kinds of frames have been stored and defined.

As a variant, the process of detecting the frame may comprise obtaining information on the frame, and then finding the frame in the image of the first and second patterns.

For example, the process of detecting the frame may comprise obtaining information on the frame by using the image capture device 26 located at a second position for taking a picture of the frame. To that end, the frame may be put on a plane surface such as a table, with the at least one lens in contact with the plane surface. In that case, the detection of the frame will also comprise obtaining a model from the image of the frame taken as described in the present disclosure with reference to FIG. 16.

If the source pattern (i.e. the first and second patterns 20) is not known (because for example the source pattern is not displayed on the screen of the smartphone), a picture of the first and second patterns 20 in front of the reflection device 28 may be taken with the image capture device 26 located at a third position, in order to obtain an image of the first and second patterns 20, so that the source pattern will be known in the coordinate system of the image capture device 26.

In a particular embodiment, a picture of the first and second patterns together with a reference object (e.g. a credit card) might be captured.

As a variant, a picture of the first and second patterns might be captured with a camera with known focal length and pixel size, in addition with camera pattern distance information provided by a sensor (e.g. telemeter).

As another variant, a picture of the first and second patterns might be captured with a 3D camera.

If the source pattern is already known in pixels and the resolution and dimensions of the smartphone 24 are known, the source pattern is already known in the coordinate system of the image capture device 26, so that it is not necessary to take a picture of the source pattern with the image capture device 26 located at the first position or at the third position.

The obtaining of (i) the first and second sets of data, (ii) relative positions of the image capture device, the lens and the first and second patterns and (iii) the rough and refined estimates of the at least one optical parameter, will be described below in detail in a particular embodiment of the method, in which, in step 10, (a) the obtaining the image of the first pattern comprises reflecting, by a reflection device, the first pattern before it is seen by the image capture device through the lens and (b) the obtaining the image of the second pattern comprises reflecting, by the reflection device, the second pattern before it is seen by the image capture device outside the lens. Namely, it may be assumed that the step of seeing by the image capture device is carried out after the step of reflecting by the reflection device.

Figure 2:
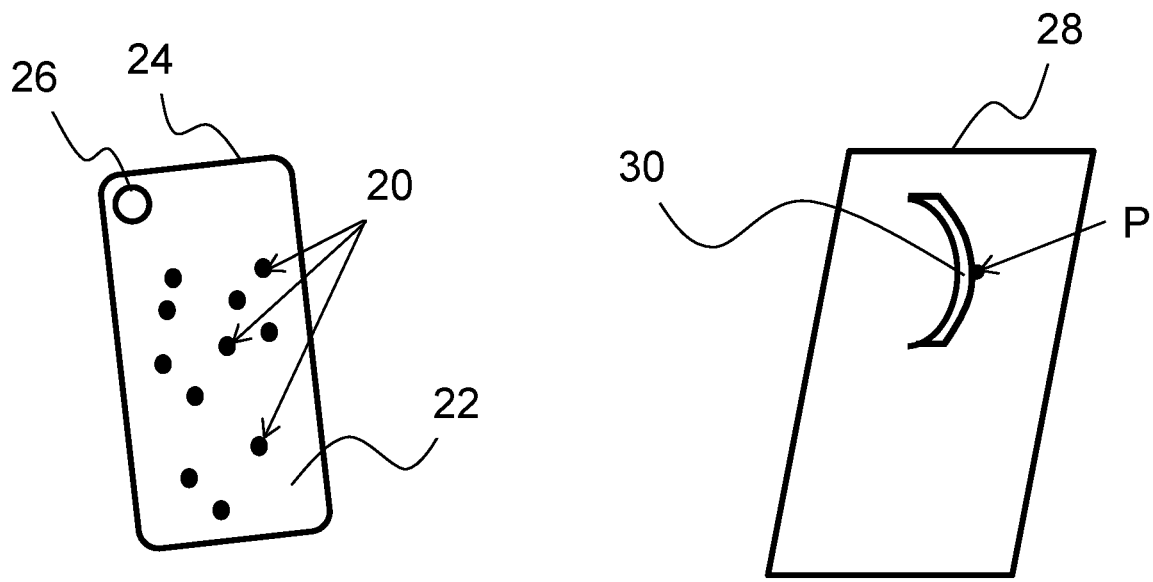
FIG. 2 is a schematic view of an ophthalmic lens, an image capture device, patterns and a reflection device used in a particular embodiment of a method for retrieving at least one optical parameter of an ophthalmic lens according to the present disclosure.

In this particular embodiment, as shown in FIG. 2, the first and second patterns 20 are part of a 2D pattern which is for example displayed on the screen 22 of a smartphone 24. By way of non-limiting example, the image capture device 26 is the front camera of the smartphone.

The patterns 20 can be seen by the image capture device 26 thanks to a reflection device 28 which, by way of non-limiting example, is a mirror. The lens 30 (or a frame, if any, on which the lens 30 is mounted) is located between the image capture device 26 and the reflection device 28 so that the front surface of the lens 30 is tangent to the reflection device 28 at a contacting point P. The first and second patterns 20 and the image capture device 26 are oriented towards the lens 30.

For stability, the mirror may be put on a wall, in a vertical position, or on a table, in a horizontal position.

In a particular embodiment where the lens 30 is mounted on a frame, the above-mentioned general principle of the disclosure may be implemented as follows:
- the frame may be known i.e. "frame learning" may be implemented by obtaining an image of the frame, with the image capture device 26 taking a picture of the frame for example with the back camera of the smartphone 24, if the smartphone 24 is equipped therewith, the frame being put for example on a table;
- the deformation of the source pattern seen by the image capture device 26 through the lens 30 may be known by obtaining an image of the source pattern, with the image capture device 26 taking a picture of the frame while a user is holding the frame in contact with the reflection device 28; and
- if the source pattern is unknown, it may be known by obtaining an image of the source pattern with the image capture device 26 taking a picture of the source pattern displayed on the screen 22 of the smartphone 24 and seen by the image capture device 26 via the reflection device 28.

In that embodiment, the coordinate system of the source pattern is constrained to the coordinate system of the camera of the smartphone 24, as they are physically bound to one another. The coordinate system of the frame is partially known, because the frame is held in contact with the reflection device 28.

Obtaining the first set of data, the second set of data and retrieving the at least one optical parameter implies calculations, which may be done through an algorithm fully embedded in the smartphone or running in a remote computer, or via an application (API) available on the cloud, or with a combination of elements embedded in the smartphone and elements available in a remote computer and/or on the cloud. Such a combination makes it possible to optimize the volume of data transferred and the computation time needed.

The above-mentioned calculations are detailed below in the particular embodiment of FIG. 2.

The calculations may be done in two parts.

The first part of the calculations is based on the points of the source pattern outside the lens 30. It is related to the second set of data mentioned previously.

In brief, in the first part of the calculations, the points outside the lens are used for determining the relative positions (including orientation and location) between the mirror and the camera i.e. the positions of the mirror and camera with respect to each other, by using ray tracing and running an optimization algorithm.

The first part of the calculations is described below in more detail.

In the following, a coordinate system R is a system uniquely determining the position of points or other geometric elements in an Euclidean space, by assigning a set of coordinates to each point. By way of non-limiting example, the set of coordinates used below is (x, y, z), referring to three axes X, Y, Z that are orthogonal to each other. $Q_{object,R}$ is an object point expressed in the coordinate system R.

Figure 3:
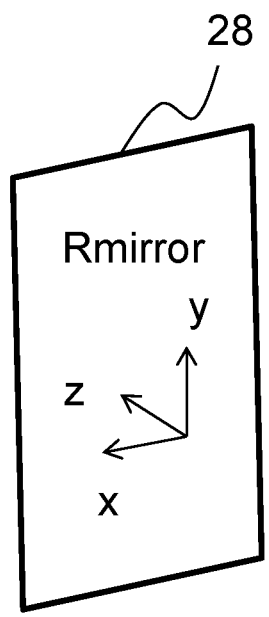
FIG. 3 is a schematic view of a reflection device used in the particular embodiment of FIG. 2 and shows a coordinate system of the reflection device.

FIG. 3 shows the mirror and Rmirror.

As the front surface of the lens 30 is tangent to the mirror, it is assumed that the coordinate system Rlens of the lens 30 is the same as the coordinate system Rmirror of the mirror: Rlens=Rmirror. The coordinate system of the smartphone 24 (also referred to as the "device") is denoted Rdevice and the coordinate system of the image capture device 26 (also referred to as the "camera", by way of non-limiting example) is denoted Rcamera. Since the source pattern (displayed on the screen of the device) and the image capture device 26 are physically on the same device, which is the smartphone 24, the transformation between Rdevice and Rcamera is known.

The transformation between Rmirror and Rdevice is calculated. This fully determines the transformation between Rcamera and Rlens:

$$R_{camera \rightarrow lens} = R_{camera \rightarrow device} * R_{device \rightarrow mirror} * R_{mirror \rightarrow lens},$$

where $R_{mirror \rightarrow lens}$ is the identity.

It is assumed that the physical dimensions of the screen 22 are known, so that the same notation is used for the object points which may be obtained in pixel units and for referring to the corresponding 3D points in Rdevice.

Images of the $Q_{object}$ points are invariant with respect to rotations around the Z axis of the mirror and translations along the X and Y axes of the mirror. Therefore, only rotations around the X and Y axes of the mirror and translations along the Z axis of the mirror can be retrieved using the reflected points of the source pattern.

Let us define the following change of coordinate system from the device to the mirror, denoted $K_{device \rightarrow mirror}$:

$K_{device \to mirror}(\theta_x, \theta_y, t_z) = \{P_{Rdevice} \to P_{Rmirror} = \rho_y(\theta_y)\rho_x(\theta_x) P_{Rdevice} + T_z(t_z)\}$, where: $\theta_x$, $\theta_y$ and $t_z$ are the parameters of the change of coordinate system from the device to the mirror, $P_{Rdevice}$ is a 3D point expressed in the coordinate system of the device, $P_{Rmirror}$ is a 3D point expressed in the coordinate system of the mirror, $\rho_y$, $\rho_x$ and $T_z$ are respectively rotation matrices around the Y and X axes and a translation vector along the Z axis.

The function Reflect: $(Q_{Rmirror}, C_{Rmirror}) \to Z_{Rmirror}$, calculates the image of an object point $Q_{Rmirror}$ on the mirror, seen by the camera point $C_{Rmirror}$, after being reflected on the mirror. The result $Z_{Rmirror}$, as well as the object point $Q_{Rmirror}$ and the camera point $C_{Rmirror}$, are expressed in the coordinate system Rmirror of the mirror.

Figure 4:
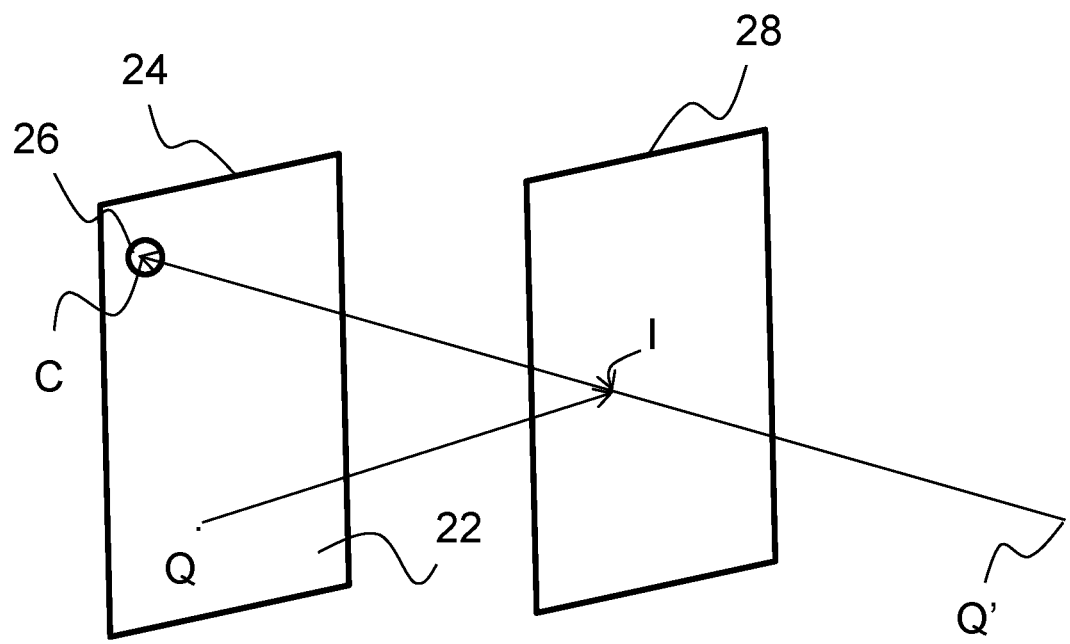
FIG. 4 is a schematic view illustrating a function involved in calculations comprised in the method according to the present disclosure, in the particular embodiment of FIG. 2.

This is illustrated by FIG. 4, where C is a pinhole of the camera, Q is a point of the source pattern displayed on the screen 22, Q' is the image point of Q via the mirror, I is the intersection between the mirror plane and the ray connecting Q' and C. The point I is outside the lens. The mirror plane and the camera plane are not necessarily parallel.

Let us define $Z_{camera}(Q_{Rdevice}, \theta_x, \theta_y, t_z)$ as the image point of the object point Q expressed in the coordinate system Rdevice of the device, as seen by the camera after reflection on the mirror. The rotation and translation parameters show the dependence of the image on the orientation of the device with respect to the mirror. The result $Z_{Rcamera}$ is expressed in the coordinate system Rcamera of the camera. The following formula makes explicit how the $Z_{Rcamera}$ image point is calculated:

$$Z_{Rcamera}(Q_{Rdevice}, \theta_x, \theta_y, t_z) = (K_{camera \to device} \circ K_{device \to mirror})^{-1} \circ \text{Reflect}(K_{device \to mirror} Q_{Rdevice}, K_{device \to mirror} C_{Rdevice})$$

where the sign "o" is the operator performing a composition of functions. In other words, the following operations are made:

transpose the object point $Q_{Rdevice}$ and the camera point $C_{Rdevice}$ in the coordinate system Rmirror of the mirror, using the $K_{device \to mirror}$ function;

use the Reflect function to calculate the image point in the coordinate system Rmirror of the mirror;

transpose the image in the coordinate system of the camera, which requires a function $K_{mirror \to camera}$, as the functions $K_{camera \to device}$ and $K_{device \to mirror}$ are known, the function $K_{mirror \to camera}$ can be retrieved by composing them and then using the inverse function:

$$K_{mirror \to camera} = (K_{mirror \to device} \circ K_{device \to camera}) = (K_{camera \to device} \circ K_{device \to mirror})^{-1}$$

The 3D image point $Z_{Rcamera}$ can then be projected onto the 2D camera plane, in pixel units, using an appropriate camera model. By way of non-limiting example, a well-known pinhole camera model that factors in radial and tangential distortions may be used. Projection of a 3D image point on to the camera plane may use some camera parameters such as intrinsic parameters $f_x$, $f_y$, $c_x$, $c_y$ and distortion parameters (see below). Such parameters may be obtained in many different manners, such as camera calibration, as detailed below by way of non-limiting example.

The camera model is defined as follows for an object point (x,y,z) expressed in the coordinate system Rcamera of the camera:

$$\begin{cases} x' = \dfrac{x}{z} \\ y' = \dfrac{y}{z} \\ r = \sqrt{x'^2 + y'^2} \\ x'' = x'(1 + k_1 r^2 + k_2 r^4 + k_3 r^6) + 2p_1 x' y' + p_2(r^2 + 2x'^2) \\ y'' = y'(1 + k_1 r^2 + k_2 r^4 + k_3 r^6) + 2p_2 x' y' + p_1(r^2 + 2y'^2) \\ \text{Project } (x, y, z) = (u, v) = (f_x x'' + c_x, f_y y'' + c_y) \end{cases}$$

$f_x$ and $f_y$ are the focal lengths of the camera, in pixel units; assuming that (Ox, Oy, Oz) is the coordinate system of the camera, $c_x$ and $c_y$ are the coordinates in pixels in the sensor coordinate system of the principal point, which is the intersection of the Oz axis with the image plane; by way of non-limiting example, in the above-mentioned pinhole model, Oz is the axis orthogonal to the camera sensor;

$k_1$, $k_2$ and $k_3$ are radial distortion coefficients;

$p_1$ and $p_2$ are tangential distortion coefficients;

"Project" is a function that projects onto the camera sensor the 3D object point (x,y,z) expressed in the camera coordinate system. The result is a 2D object point in pixel units.

This model requires that the camera be accurately calibrated, so that $f_x$, $f_y$, $c_x$, $c_y$, $k_1$, $k_2$ and $k_3$ are known precisely.

However, a camera model different from the one described above (either more complex, or simpler) may be used, depending on the degree of precision necessary for a particular use of the method according to the present disclosure.

The orientation of the device with respect to the mirror, denoted, can then be estimated by minimizing the following cost function $J_{orientation}$:

$$J_{orientation}(\theta_x, \theta_y, t_z) = \frac{1}{2} \begin{Vmatrix} \text{Project}(Z_{Rcamera}(Q^1_{object,Rdevice}, \theta_x, \theta_y, t_z)) - Q^1_{image} \\ \vdots \\ \text{Project}(Z_{Rcamera}(Q^m_{object,Rdevice}, \theta_x, \theta_y, t_z)) - Q^m_{image} \end{Vmatrix}^2$$

where m is an integer higher than or equal to 1.

$$(\theta^*_x, \theta^*_y, t^*_z) = \arg\min_{(\theta_x, \theta_y, t_z)} J_{orientation}(\theta_x, \theta_y, t_z)$$

The above equation can be solved by using any non-linear least-squares algorithm, such as the Gauss-Newton or the Levenberg-Marquardt algorithm.

In brief, ray-tracing and optimization enable to know the relative positions of the mirror, frame and lens in the camera coordinate system, that is to say the positions of the mirror, frame and lens with respect to each other in the camera coordinate system.

The second part of the calculations is based on the points of the source pattern seen by the image capture device 26 through the lens 30.

In brief, in the second part of the calculations, the points inside the lens and the relative positions (including orientation and distance) between mirror and camera which were determined in the first part of the calculations are used, by running an optimization algorithm and using ray tracing, for:

determining an initial lens, which, by way of non-limiting example, may be a planar lens or a random spherical lens, or which may be an estimated geometry based on a rough estimation of lens magnification; and optimizing the initial lens to solve a least squares problem, including minimizing a cost function that is calculated by using ray tracing on points of the first pattern, where the position of the points on the first pattern is known and their image is obtained by ray tracing and compared to the points on the first pattern.

The second part of the calculations is described below in more detail.

In a particular embodiment, in order to estimate the power of the lens 30, the observed magnification is used for calculating the linear magnification, as follows:

$$\text{Power} = \frac{\text{LinearMagnification} - 1}{\text{LinearMagnification} \cdot t_z^*}$$

where $t_z^*$ is the distance from the device to the mirror (which is approximately the same as the distance from the device to the lens 30), obtained previously.

In order to obtain the linear magnification, the area magnification is first calculated, by forming the convex hull of the refracted and reflected object points, denoted respectively $\overline{P_{object}}$ and $\overline{Q_{object}}$. The corresponding image points are denoted respectively $\overline{P_{image}}$ and $\overline{Q_{image}}$.

$$\text{AreaMagnification} = \frac{\text{Area}(\overline{Q_{object}})}{\text{Area}(\overline{P_{object}})} \cdot \frac{\text{Area}(\overline{P_{image}})}{\text{Area}(\overline{Q_{image}})}$$

The linear magnification is taken as the square root of the area magnification, which then gives an estimate of the power of the lens 30.

This is a rough estimate, because it does not account for astigmatism and the paraxial approximation is implied in the lens power formula, which means that the rays are assumed to make a small angle with respect to the optical axis and enter the lens close to the optical center.

In the following steps, an estimated physical lens is calculated, which will serve as a starting point for the optimization algorithm.

Using the estimated power, the most likely lens material is selected. A non-limiting example of classification regarding the refractive index (hereafter "Index") of the material is given below:

If 0≤|Power|<2, Index=1.50
If 2≤|Power|<4, Index=1.60
If 4≤|Power|<6, Index=1.67
If 6≤|Power|, Index=1.74

Using the estimated power and the lens material, a spherical front surface $S_{front}$ is chosen, based on a compromise between esthetics and optical performance. This process is called base curve selection and is specific to each lens manufacturer. However, it is considered that the selected front surface will not vary greatly between manufacturers for a given prescription and a given material.

In that step, a center thickness for the lens is selected as well and is denoted e.

Then, a rear spherical surface is calculated in order to match the estimated power. This may be done by using a thin lens model:

$$S_{front} = \frac{\text{Index} - 1}{\text{FrontRadius}}$$

$$\text{RearRadius} = -\frac{S_{Front} \cdot \text{FrontRadius}}{\text{Power} - S_{Front}}$$

where Index is the refractive index and FrontRadius and RearRadius are respectively the radii of the spherical front and rear surfaces.

A ray-tracing based least-squares optimization is performed in order to find a physical lens (hereafter "OptimalLens") that yields the same image $P_{image}$ of the $P_{object}$ set of points as the one observed, i.e. Image(OptimalLens,$P_{object}$)= $P_{image}$.

As mentioned previously, the lens front surface is assumed to be tangent to the mirror at the contact point.

Figure 5:
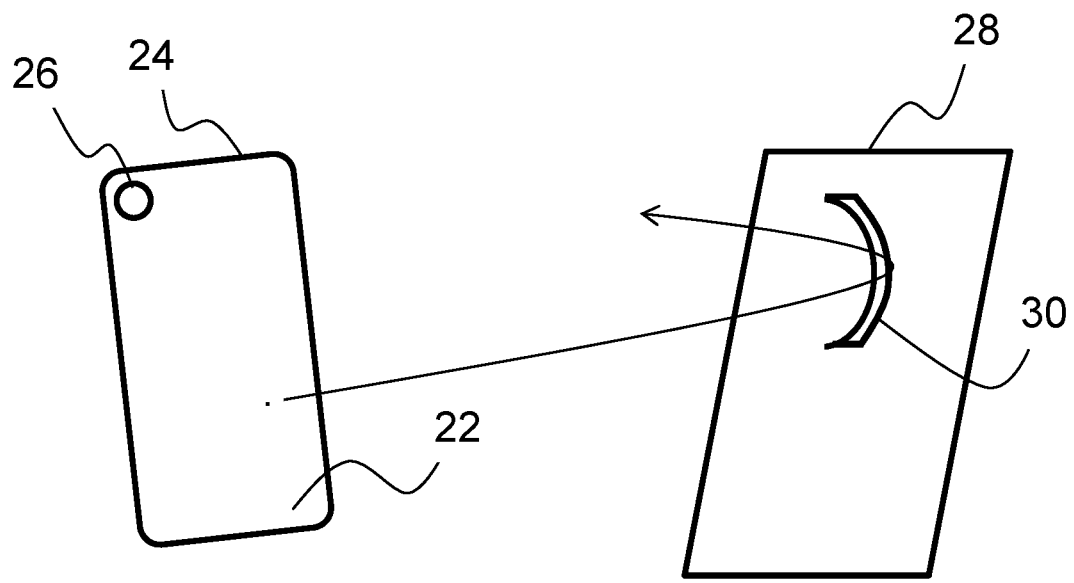
FIG. 5 is a schematic view illustrating another function involved in calculations comprised in the method according to the present disclosure, in the particular embodiment of FIG. 2.

For an object point $P_{object,Rmirror}$, let us define the function Propagate($P_{object,Rmirror}$, $C_{Rmirror}$, Lens)→$W_{Rmirror}$, which calculates the image of the object point $P_{object,Rmirror}$ seen by the camera point $C_{Rmirror}$, after being refracted by the lens 30 and reflected on the mirror, then refracted by the lens 30 once more, as shown in FIG. 5. The result $W_{Rmirror}$ is expressed in the coordinate system Rmirror of the mirror. Such a ray is calculated using a simple Newton scheme. The image point $W_{Rmirror}$ is then the intersection of the exit ray with the lens rear surface.

At this point, the orientation and distance of the device (i.e. the smartphone 24) with respect to the mirror are known, thanks to the first part of the calculation described previously.

Using the same notation as before for the transformation from the coordinate system Rdevice of the device to the coordinate system Rmirror of the mirror, we have $K_{device \to mirror}(t_x, t_y) = K_{device \to mirror}(\theta^*_x, \theta^*_y, t^*_z) + T_x(t_x) + T_y(t_y)$.

The previously estimated physical lens is used as a starting lens, which can then be optimized.

Namely, a toroidal rear surface will replace the spherical rear surface of the previously estimated physical lens, with both torus radii equal to the sphere radius at the beginning of the optimization process. The torus radii of the lens rear surface are denoted $r_1$ and $r_2$ and the torus axis of the lens rear surface is denoted a.

Given an object point $P_{object,Rdevice}$ expressed in the coordinate system Rdevice of the device, $W_{Rcamera}$ is its image point seen through the lens 30, expressed in the coordinate system Rcamera of the camera:

$W_{Rcamera}(P_{object,Rdevice}, t_x, t_y, r_1, r_2, a) =$
$(K_{camera \to device} \circ K_{device \to mirror})^{-1} \circ \text{Propagate}$
$(K_{device \to mirror} P_{object,Rdevice}, K_{device \to mirror}$
$C_{Rdevice}, \text{lens})$ The translation parameters $t_x$ and $t_y$, which were left undetermined in the previous steps, intervene here in the device to mirror coordinate system transformation. The radii and axis parameters intervene in the lens definition.

Last, the cost function defining the least-squares problem, which has to be minimized in order to reconstruct a lens that yields the same image as the one observed, is defined as follows:

$$J_{lens}(t_x, t_y, r_1, r_2, a) = \frac{1}{2} \left\| \begin{array}{c} \text{Project}(W_{Rcamera}(P^1_{object,Rdevice}, t_x, t_y, r_1, r_2, a)) - P^1_{image} \\ \ldots \\ \text{Project}(W_{Rcamera}(P^n_{object,Rdevice}, t_x, t_y, r_1, r_2, a)) - P^n_{image} \end{array} \right\|^2$$

where n is an integer higher than or equal to 1.

$(t^*_x, t^*_y, r^*_1, r^*_2, a^*) = \text{argmin}(t_x, t_y, r_1, r_2, a)$
OptimalLens=Lens($r^*_1, r^*_2, a^*$)

The above optimization procedure may be applied to other configurations, as long as the changes of coordinate system between the camera, the source pattern and the lens are known. Of course, if no reflection device is involved and rays coming from the source pattern directly reach the camera, the propagation function would need to be adapted, by removing the reflection.

The optimal lens is calculated using the back vertex power formula in both torus meridians $S_{rear,1}$ and $S_{rear,2}$ of the lens rear surface:

$$S_{rear,1} = -\frac{Index - 1}{r_1^*}$$

$$S_{rear,2} = -\frac{Index - 1}{r_2^*}$$

Both meridians powers $P_1$ and $P_2$ are then obtained as follows:

$$P_1 = S_{rear,1} + \frac{S_{front}}{1 - \frac{S_{front} \cdot e}{Index}}$$

$$P_2 = S_{rear,2} + \frac{S_{front}}{1 - \frac{S_{front} \cdot e}{Index}}$$

where e is the center thickness.

It is assumed that $P_1 < P_2$ (if this is not the case, those values are switched).

The cylinder value is $P_2 - P_1$ in the positive cylinder convention.

The prescription axis is the torus axis a*, corrected using the rotation parameter $\theta_z$, which is the angle between the X axis in the coordinate system Rcamera of the camera and the X axis in the coordinate system Rmirror of the mirror and which is obtained using the frame detected in the picture.

In brief, the method according to the disclosure:
- takes into account the relative positions of the mirror, frame and lens calculated in the first part of the calculations;
- calculates the lens in the coordinate system Rcamera of the camera, firstly as a rough estimation based on magnification and secondly, as a refined estimation based on ray-tracing and optimization; and
- corrects the orientation of the cylinder axis.

At the end of such calculations, the power of the lens in the coordinate system Rframe of the frame is obtained.

It should be noted that it is not necessary to detect the frame for separating points that are within the lens and points that are outside the lens. Nevertheless, as frame detecting may be used in a particular embodiment for determining the cylinder axis of the lens if the lens is a single vision lens, frame detecting may also be used in that particular embodiment for securing separation of points within and outside the lens.

As described above, the method according to the disclosure is based on the use of a source pattern, a part of which is seen directly by the image capture device and another part of which is seen by the image capture device through the lens. Identification of the source pattern is detailed below.

A feature matching algorithm may be run in order to group object points on a known source pattern with the corresponding image points on the picture taken by the image capture device. The frame contour may be used as a mask to separate points seen through the lens (Pobject, Pimage) from those that are only seen on the mirror (Qobject, Qimage).

Therefore, two sets of matching points are obtained.

$$\{P_{object} = (P_{object}^1, \ldots, P_{object}^n), P_{image} = (P_{image}^1, \ldots, P_{image}^n)\}$$

$$\{Q_{object} = (Q_{object}^1, \ldots, Q_{object}^m), Q_{image} = (Q_{image}^1, \ldots, Q_{image}^m)\}$$

where n and m are integers higher than or equal to 1

By way of non-limiting example, the first and second patterns 20 may be two QR-codes displayed on the screen 22 of the smartphone 24. For example, the lower half the screen 22 may display one of the two QR-codes and the upper half of the screen 22 may display the same QR-code with a different size (e.g. bigger for negative power and smaller for positive power) and possibly other modifications. Then, the lower QR-code may be used for computing the position of the camera with respect to the lens and the upper QR-code may be used for computing the lens power.

As a number of "keypoints" may be found in a QR-code, i.e. remarkable points found on the pattern with a feature matching algorithm, keypoints may be detected on the object (i.e. the pattern shown on the screen 22) and the image (i.e. the deformed pattern on the picture taken by the image capture device 26). The feature algorithm then performs a matching between object and image keypoints. It is then known which keypoint on the object matches which keypoint on the image and their respective coordinates are also known.

Figure 6:
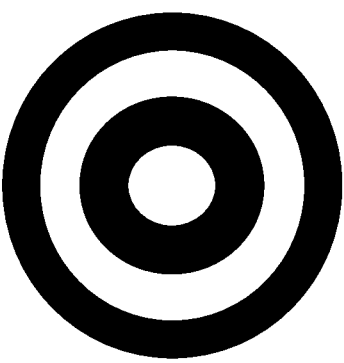
FIG. 6 shows an example of a pattern that may be used in the method according to the present disclosure.

As another example, the first and second patterns 20 may comprise concentric black rings and white rings, as shown in FIG. 6.

By way of non-limiting example, such a source pattern may be used for both the lower and the upper parts of the screen 22, i.e. both for the first pattern and the second pattern. As another example, it may be used only for the upper part of the screen 22 and a QR-code may be used for the lower part of the screen 22.

Using an image processing algorithm, the four circles of that source pattern (two black circles and two white circles) may be extracted and each circle may be discretized into a predefined number of points.

On the picture taken by the image capture device 26, representing the deformed pattern, an ellipse is fit on each circle.

Figure 7:
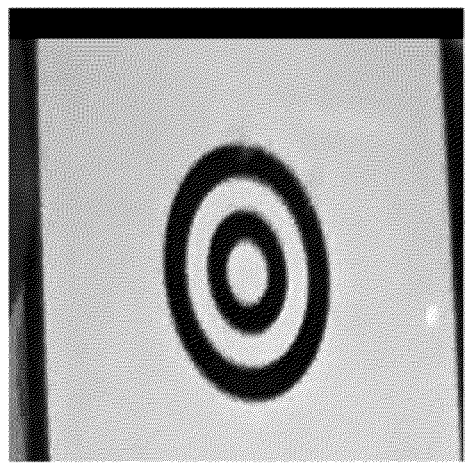
FIGS. 7, 8, 9, 10, 11 and 12 show processing steps performed on the pattern example of FIG. 6 according to the method of the present disclosure.
Figure 8:
Figure 9:
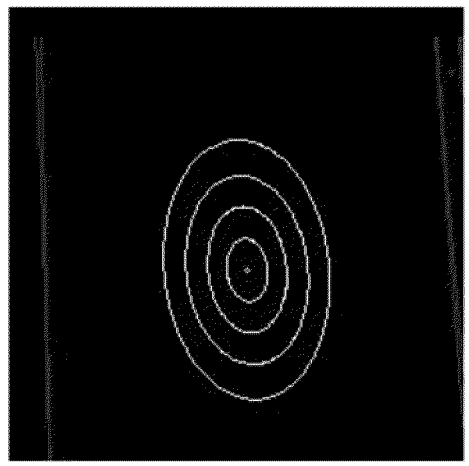

In order to find the ellipses, a Region Of Interest (ROI) may be set on the picture to restrain the research area. The picture may be converted from RGB to grayscale (as shown in FIG. 7), then to binary (as shown in FIG. 8) using a filtering method, in order to obtain the ellipses (as shown in white in FIG. 9).

Figure 10:
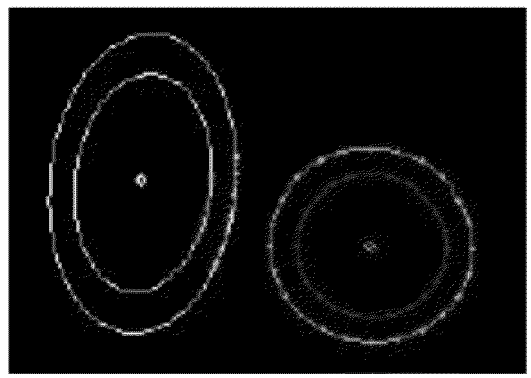

Then, the projection of each discretized point is computed from the object circles with ray tracing through the simulated lens on the 2D plane of the ellipses, so as to obtain so-called projected points. An algorithm is then used in order to find the position of the closest point, on the corresponding ellipse, of each projected point (as shown in FIG. 10).

Advantageously, only the two largest ellipses (shown on the left of FIG. 10) are used. As FIG. 10 shows the beginning of the optimization, the projected points are a circle (shown on the right of FIG. 10). The dots on the largest ellipse are the closest to each of the dots on the largest circle and the dots on the smallest ellipse are the closest to each of the dots on the smallest circle.

Figure 11:
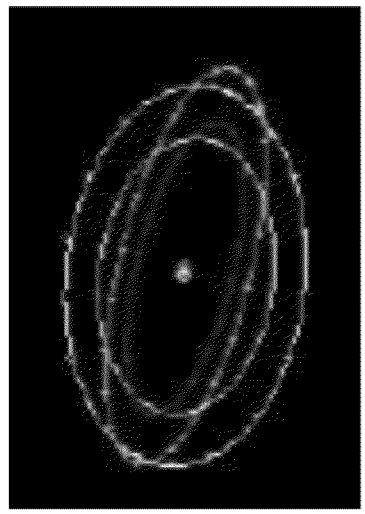

The gap in each dimension (x and y) between each point and its closest point on the ellipse is used for the optimization. The gap in each dimension between the center of each ellipse and the centroid of the corresponding projected points is also used, for example with a weight equal to the number of projected points. This makes it possible for the centroid of the projected points to converge at the same position as the center of the ellipses, as shown in FIG. 11, which is the third iteration (in a total of twenty-one iterations) of the optimization process.

Figure 12:
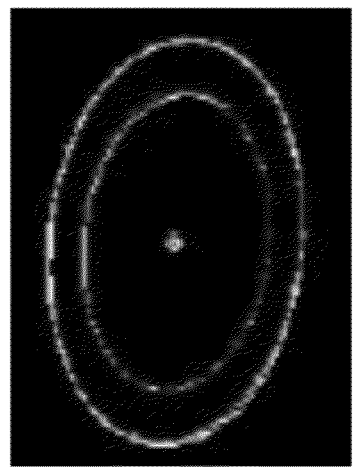

FIG. 12 shows the last iteration, where projected points match the ellipses, so that the optimization stops and the simulated lens is used for the calculation of the lens power.

Figure 13:
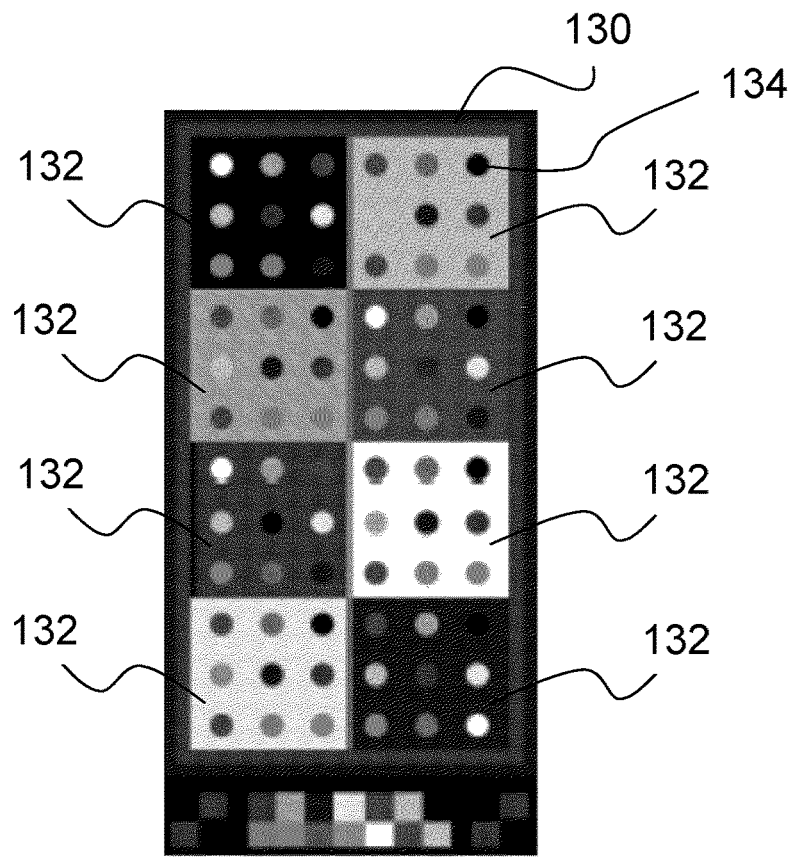
FIG. 13 shows another example of a pattern that may be used in the method according to the present disclosure.

As still another example, shown in FIG. 13, the first and second patterns 20 may comprise a grid comprising at least one colored rectangle 130 and at least one rectangular colored block 132 located within the at least one colored rectangle 130 and containing at least one colored polka-dot 134, the color of the polka-dot 134 differing from the color of the block 132.

By way of non-limiting example, the grid shown in FIG. 13 comprises two coaxial colored rectangles 130, e.g. red and blue, surrounding its edges. The widths of the rectangles 130 are optimized so that the rectangles can be detected when seen at a predetermined distance from the grid. The larger the rectangles 130, the farther they can be detected. The rectangles 130 will be used by the method of the present disclosure for determining the position of the smartphone 24 in the 3D space.

By way of non-limiting example, the grid shown in FIG. 13 also comprises eight rectangular colored blocks 132 of different colors, each of them containing three by three polka-dots 134 of different colors. The colors of the polka-dots 134 are chosen so as to be different from the color of the block 132 they belong to. Optionally, on the bottom of the grid, the colors used for the polka-dots 134 and blocks 132 are reported. This makes it possible to identify colors, in case color rendering is changed by the smartphone 24, depending on the luminous conditions and the type of smartphone 24 used. Advantageously, the resolution of the grid is adapted to the resolution of the smartphone 24.

A part of the colored polka-dots 134 may be seen through the lens 30 (this is the first pattern) and are used for determining the lens power. A part of the at least one colored rectangle 130 may be seen outside the lens 30 (this is the second pattern) and that part of the at least one colored rectangle 130 is used for determining the relative positions between the smartphone 24 and the reflection device 28, that is to say the positions of the smartphone 24 and the reflection device 28 with respect to each other.

According to the method of the present disclosure, the correspondence between the points on the grid and the points on the picture taken by the image capture device 26 has to be determined. The points seen through the lens 30 may undergo two transformations: a transformation T1 linked to the fact that the smartphone 24 may not be parallel to the reflection device 28 and an additional transformation T2 for the points seen by the image capture device 26 through the lens 30.

In order to determine T1, the two rectangles 130 are used.

Once T1 is applied, there are two different processing phases:
- an identification phase, in which, by leveraging colors of polka-dots 134 and colors of blocks 132, the points of the grid involved in the image taken by the image capture device 26 are identified; and
- a sorting phase (points within or outside the lens), in which it is determined whether the detected points are inside or outside the lens 30.

As a preferred possibility, appropriate points among those visible within the lens 30 may be automatically selected, for example by using, as a source pattern, a particular grid for detecting the optical center of the lens 30 and selecting points near the optical center for calculations. That is to say, the optical center of the lens may be determined based on the image of the first pattern. At least four points that are not aligned with each other in the first pattern are required to determine the optical center. Such points may be obtained from a great variety of patterns, such as a square, a QR-code, a grid, etc. Various non-limiting examples of patterns are described in the present disclosure, e.g. the grid described with reference to FIG. 13.

In embodiments where a mobile device such as the smartphone 24 is used, for better ensuring that a part of the grid will be seen inside the lens, before displaying the grid or any other pattern as described previously, the "selfie" mode video may be displayed on the screen of the smartphone 24 and a third pattern (such as a blue square, a logo or any other pattern deemed appropriate) may be displayed on the upper part of the screen of the smartphone 24 over the "selfie" mode video. As a preferred possibility, the position of the third pattern displayed on the screen is the same as the position of the first pattern displayed on the screen of the smartphone 24.

Figure 20:
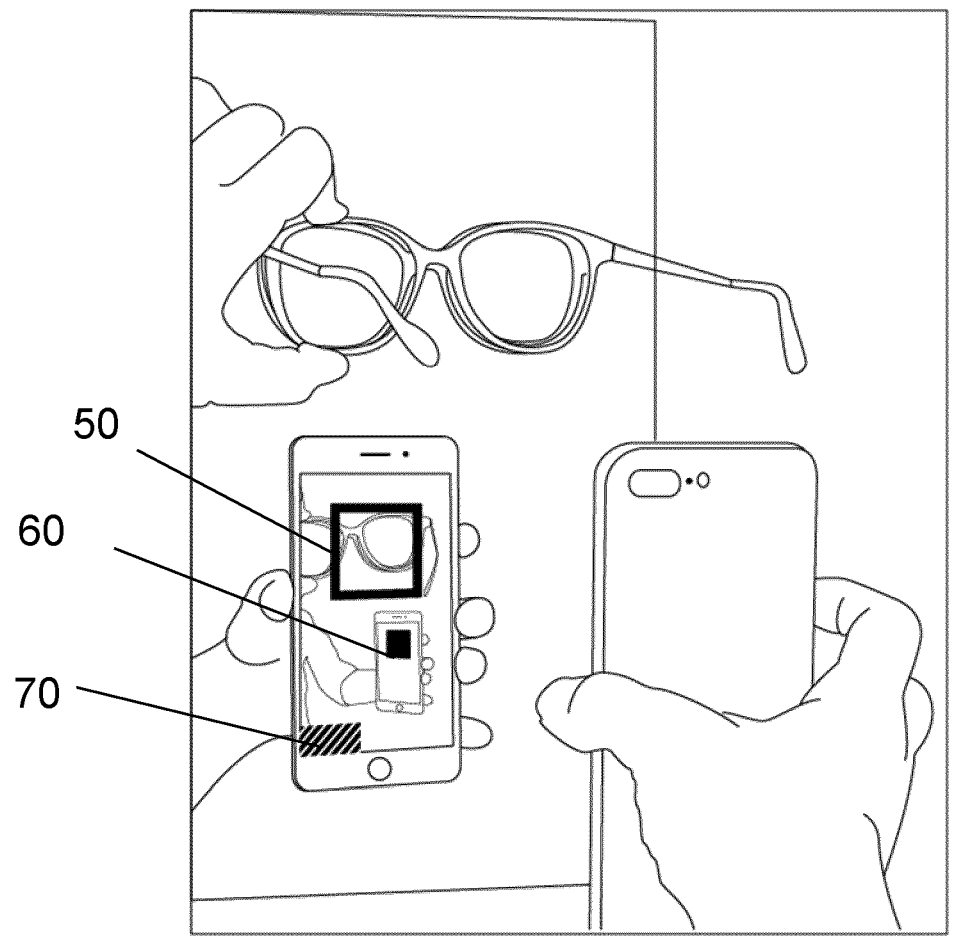
FIG. 20 shows other examples of patterns that may be used in the method according to the present disclosure.

In a particular embodiment, shown in FIG. 20, a first image of the third pattern 50 captured by the image capture device 26 is a colored square, e.g. a blue empty square. An image comprising a plurality of images of the third pattern having decreasing size is captured by the image capture device 26 in selfie mode(also known as ""mise en abyme" effect), among which, the first image of the third pattern 50 is the biggest without lens.

The size and the color of the third pattern are selected so that the user is not too much disturbed by the patterns displayed on the screen of the smartphone 24 in the selfie mode video whereas the displayed third patterns can be correctly detected by image processing.

As a preferred possibility, a fourth pattern (such as a blinking red filled square or any other pattern deemed appropriate) may also be displayed on the screen of the smartphone 24 in the "selfie" mode video so as to superimpose a second image of the third pattern which is captured by the image capture device 26 after reflection by the reflection device 28. As shown in FIG. 20, an image of the fourth pattern 60 in the reflection device is superimpose the second image of the blue empty square, so that the second image of the blue empty square in the reflection device 28 is hidden. That is to say, the second image of the blue empty square can be detected by image processing and then hidden by displaying a blinking red filled square over it. The fourth pattern 60 is then used in order to guide the user to look at the right pattern to position the smartphone correctly, e.g. to position the image of the fourth pattern within the image of the frame. By way of non-limiting example, the image capture device 26 is the front camera of the smartphone and the screen of the smartphone displays the direct image take by the front camera.

By way of non-limiting example, shown in FIG. 20, an image of a fifth pattern 70, such as a rectangle, a QR-code, or any other pattern deemed appropriate, is captured by the image capture device 26. The fifth pattern is used to calculate the distance from the smartphone to the reflection device 28 by using the algorithms as described above.

In a variant of the grid of FIG. 13, polka-dots may be present inside the third or fourth pattern used for better ensuring the above-mentioned rough positioning. This makes it possible to combine at the same time rough positioning control and optical center detection.

In addition, several patterns may be displayed successively in order to guide the user and obtain the images needed for the calculations. Such successive displaying may be automatic or manual.

For example, the user may be guided as follows:
put the frame on the mirror,
put the smartphone close to the lens,
move the smartphone backward to be at a given distance, e.g. about 30 cm, from the mirror, by using the above-mentioned third or fourth pattern (used for better controlling the above-mentioned rough positioning) and by using the selfie mode to move the smartphone correctly,
take the picture with the camera of the smartphone 24.

As a variant, the control of the distance may be done by using the algorithms as described above. Then, the user may be asked to stop moving backward when the expected distance is reached and the picture(s) may be taken by using the algorithms as described above.

Then, the algorithm would detect that some points (from the above-mentioned first pattern) are within the lens 30, by analyzing the distance between the polka-dots, use these points to detect the optical center of the lens 30 and select the points that are near the optical center.

Just after taking the picture of the source pattern, the user may be asked to take another picture while the upper part of the source pattern is replaced by a white image (or any other homogeneous background) to see the frame correctly and facilitate frame detecting. The above-mentioned bottom of the grid would be maintained, so that it can be checked that the smartphone 24 has not moved between the two successive pictures or the smartphone displacement may be taken into account in the calculations.

By way of non-limiting example, once the smartphone is positioned correctly in front of the frame/mirror, three different patterns may be used successively, in an order depending on the computation time of the algorithms: for example the grid of FIG. 13 to find the optical center of the lens, a white screen to detect the frame and the circular pattern of FIG. 6 to retrieve the lens power.

For the above-mentioned rough positioning, using some types of mobile devices may be particularly advantageous. For example, using a tablet instead of the smartphone 24 may be more advantageous in this respect, because the probability that a part of the grid will be seen inside the lens is higher than when using a smartphone, as a tablet generally has a bigger size than a smartphone.

Figure 14:
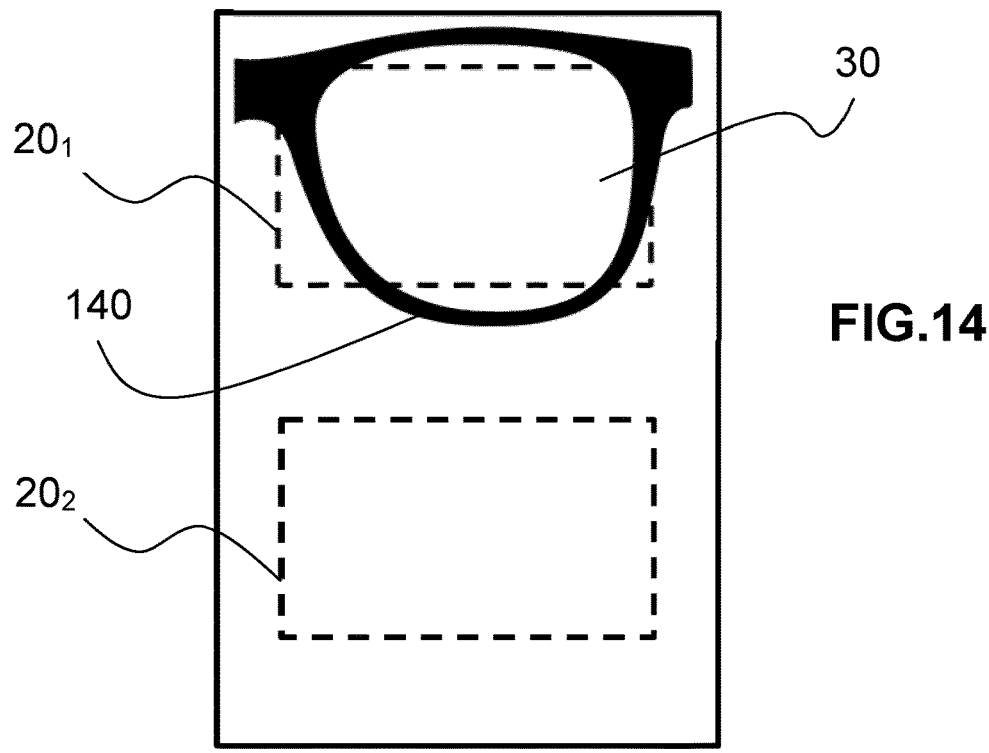
FIG. 14 shows first and second patterns and a frame that may be used in the method according to the present disclosure and disposed according to a particular embodiment.

More generally, FIG. 14 shows an embodiment where the lens 30 is mounted on a frame 140 (only one lens 30 is shown and therefore, only half of the frame 140 is shown) and where any kind of first pattern 201 is seen by the image capture device 26 through the lens 30 and any kind of second pattern 202 is seen directly by the image capture device 26 i.e. outside the lens 30.

Even more generally, the first and second patterns may form a single source pattern that is not divided in two patterns, or the first and second patterns may be two patterns, that are either identical, or of two different shapes and/or colors, or each one of the first pattern and the second pattern may be displayed alone.

FIGS. 17 and 18 show other non-limiting examples of patterns, which may be used for retrieving optical parameters such as the power and optical center of the lens. By way of non-limiting example, the pattern in FIG. 17 has two concentric circles at the top and two concentric squares at the bottom and the pattern in FIG. 18 has two concentric squares at the top and a QR code at the bottom. Nevertheless, various combinations of tops and bottoms of such patterns may be used.

In any of the above-mentioned pattern configurations:
at least a part (or portion) of the pattern (or the second pattern if there are two patterns) that is outside the lens, which is the part of the pattern (or the second pattern if there are two patterns) that is seen directly (i.e. not through the lens) by the camera, is used for determining the relative positions (including orientation and distance) between mirror and camera, i.e. the positions of the mirror and camera with respect to each other; and
at least a part (or portion) of the pattern (or the first pattern if there are two patterns) that is within the lens, which is the part of the pattern (or the first pattern if there are two patterns) that is seen through the lens by the camera, is used for retrieving the lens power.

Figure 15:
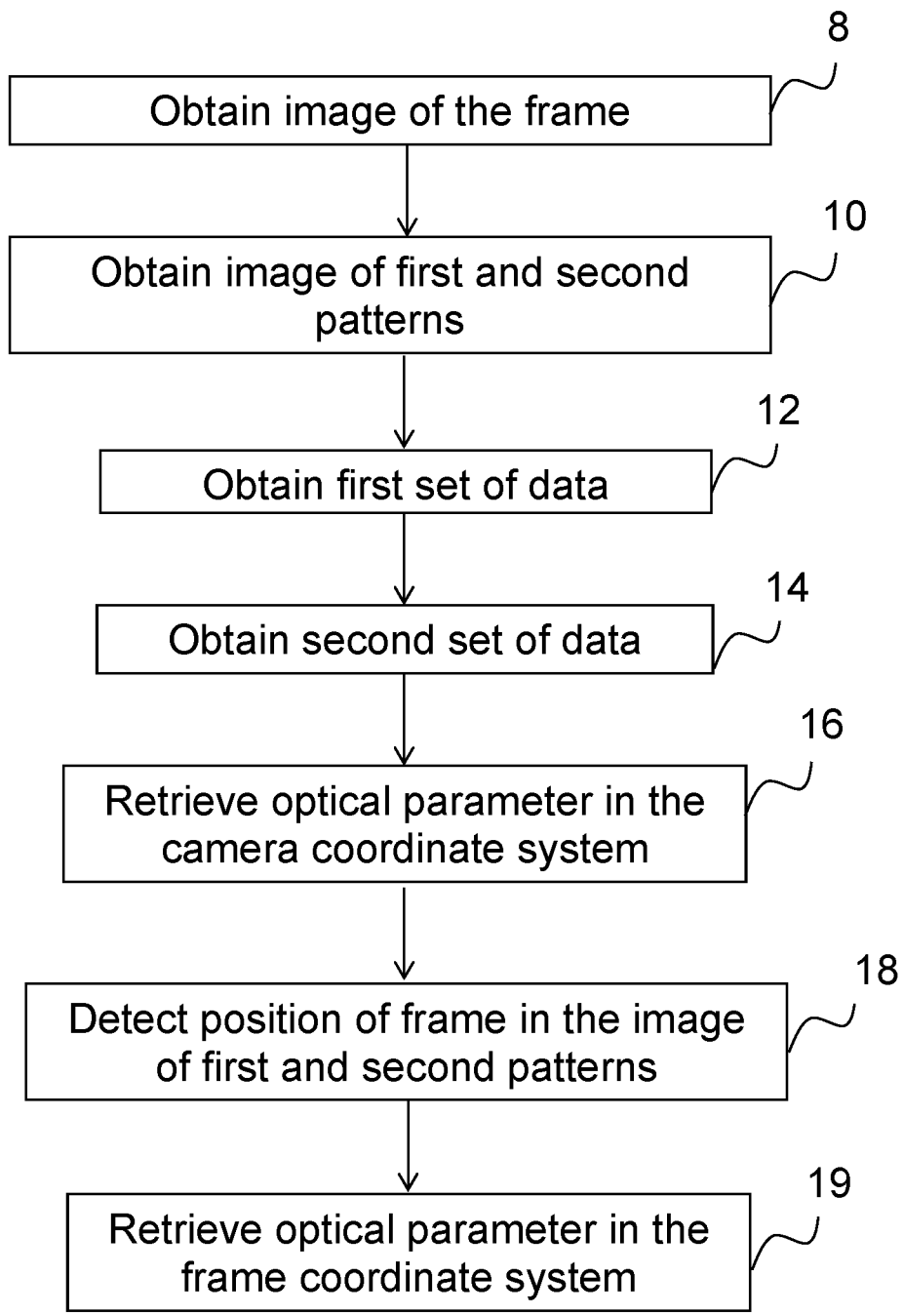

As shown in FIG. 15, in a particular embodiment where the lens is mounted on an eyeglasses frame, a method according to the disclosure, for retrieving at least one optical parameter of an ophthalmic lens, comprises:
a first step 8 of obtaining an image of the frame;
steps 10, 12, 14 as described with reference to FIG. 1;
step 16 as described in FIG. 1 and in which the at least one optical parameter is retrieved in the camera coordinate system;
a step 18 of detecting the position of the frame in the image of the first and second patterns; and
a step 19 of retrieving the at least lone optical parameter in the frame coordinate system.

FIG. 16 shows a non-limiting example of the result of step 8 of obtaining an image of the frame. The top portion of the drawing shows a non-limiting example of a pair of eyeglasses comprising a frame and at least one ophthalmic lens 30 and to which the method of FIG. 15 may be applied and the bottom portion of the drawing shows the obtained image of the frame.

In the "frame-learning" stage, for facilitating for a user the operation of obtaining an image of the frame, the image capturing may be guided e.g. by displaying centering and/or aligning marks on the screen 22 of the smartphone 24, so that the positioning of the frame on a table with preferably homogeneous background be optimal (e.g. frame visible on the full width of the picture, centered and aligned with the horizontal axis). By way of non-limiting example, the above-mentioned marks may be red at the beginning and become green when predefined conditions are respected.

By way of non-limiting example, if the smartphone 24 is equipped as usual with a gyroscope, such gyroscope may be used for alerting the user if the smartphone 24 is not positioned correctly (e.g. horizontal/parallel to the table).

The color of the background may then be detected by means of a histogram analysis of the colors. The background may then be extracted by a flood fill (also known as seed fill) algorithm. Then, the image of the frame may be binarized and morphology operators which are known per se may be applied to extract the part of the image corresponding to the frame and its mask, i.e. its contour. Any residual rotation of the image may be corrected by techniques known per se.

Using the information on the frame (also referred to as a "model" of the frame) obtained in the "frame learning" stage, the spectacle frame contour can be detected in the picture taken with the help of the reflection device 28 during the frame detection stage: the scaling factor to apply to the model may be calculated based on the distance from the smartphone 24 to the frame. The lens to search (left or right) is known. The useful part of the frame may be extracted and the photo may be enlarged on the edges. A certain number of orientations of the model of the frame may be tested in order to find the best position of the frame by studying, for each angle, the correlation between the frame visible in the image of first and second patterns 20 and the model obtained during the "frame learning" stage. If the frame is detected, the best position (location and orientation) of the frame in the image is selected. The technique described above is also valid when the frame is partially visible in the image of the first and second patterns 20.

A system according to the disclosure, for implementing a method for retrieving at least one an optical parameter of an ophthalmic lens, comprises means adapted to perform the above-mentioned steps of the method.

In a particular embodiment, the system may comprise a reflection device and a mobile device equipped with the above-mentioned image capture device.

The mobile device may comprise a display unit and the first and second patterns may be bidimensional patterns displayed on the display unit.

The mobile device may be a smartphone and the image capture device may be a front camera of the smartphone, as described above in connection with a particular embodiment of the method, shown in FIG. 2.

As also described with reference to FIG. 2, the reflection device may be a mirror.

Figure 19:
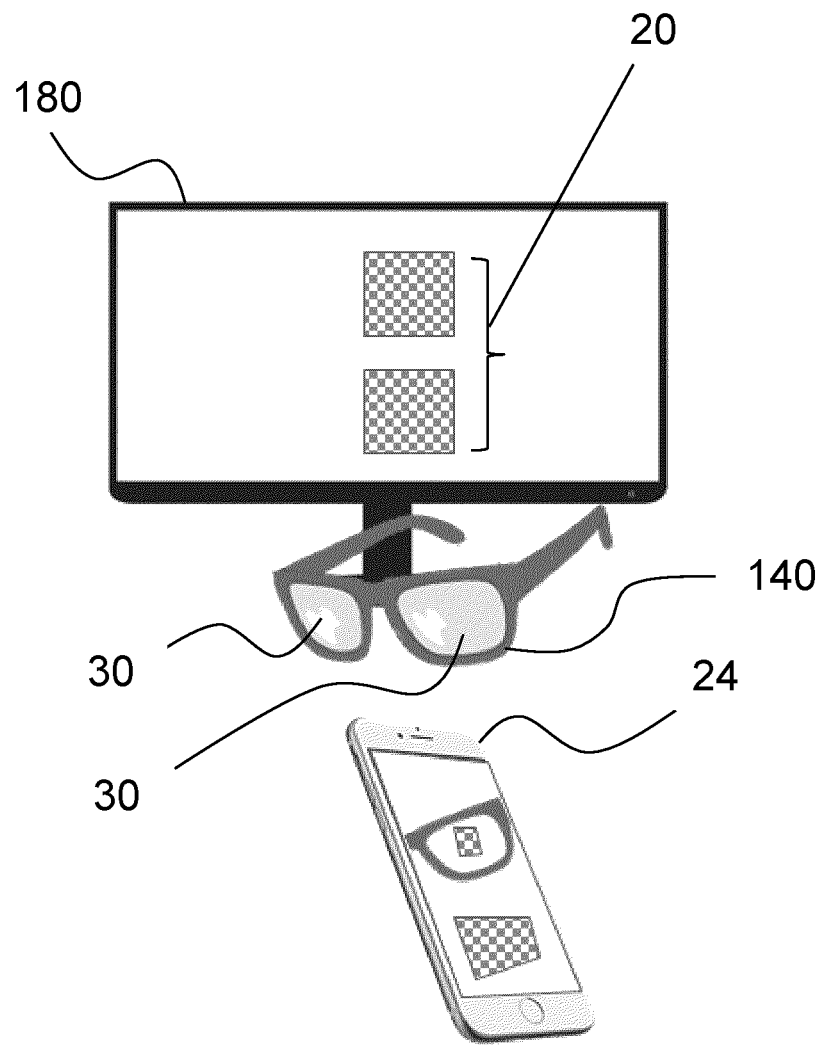
FIG. 19 is a schematic view illustrating other embodiments of the method and system according to the present disclosure, involving a smartphone and a computer.

The schematic view of FIG. 19 encompasses various embodiments of the method and system according to the present disclosure. In those various embodiments, in addition to at least one processor and an image capture device, the system according to the disclosure comprises a smartphone 24 and a computer 180.

As will be seen below from the detailed description of those various embodiments, the computer 180 may be used for displaying the first and second patterns 20, while the smartphone 24 may be used for capturing images. In other words, in such a configuration, two electronic devices are involved.

On the other hand, in previously described embodiments of the present disclosure not involving any computer, but only the smartphone 24 and the reflection device 28, the smartphone 24 may be used both for displaying the first and second patterns 20 and for capturing images. In other words, in such a configuration, only one electronic device is involved. In addition, in such a configuration, in case the at least one lens 30 is mounted on a frame, the position of the frame 140 may be at least partially known by simply positioning the frame 140 in contact with the reflection device 28. Thus, the obtaining of relative positions of the reflection device 28, the frame 140 if any, and the image capture device 26 (i.e positions of the reflection device 28, the frame 140 and the image capture device 26 with respect to each other) becomes simplified.

Therefore, the configuration combining the use of the smartphone 24 and the reflection device 28 is a simplified configuration in comparison with the configuration combining the use of the smartphone 24 and the computer 180.

According to one of those embodiments, the implementation of the method according to the disclosure comprises:
  displaying the first and second patterns 20 on the screen of the computer 180 or printing them on a piece of paper,
  using an image capture device such as a back camera of the smartphone 24,
  holding at least one lens 30 and/or the frame 140 between the first and second patterns 20 and the smartphone 24 so that the first pattern is seen through the lens and the second pattern is seen directly (i.e. outside the lens) by the image capture device.

By way of non-limiting example, the implementation of the method according to the disclosure further comprises: prior to displaying the first and second patterns 20, displaying the third pattern on the screen of the computer 180 to better guide the user and replace it with the first pattern to find the optical center and the power.

In an embodiment encompassed by FIG. 19 where the first and second patterns 20 are not known and if (i) the distance from the first and second patterns 20 to the image capture device and (ii) the distance from that one of the lenses 30 to the image capture device are known, the at least one optical parameter of that lens 30, e.g. sphere and cylinder, can be retrieved from the first and second sets of data by calculating the magnification between the first pattern and the second pattern.

In such an embodiment, the upper part of the source pattern is advantageously identical to the lower part of the source pattern. Moreover, if the upper and lower parts do not have the same size, the method according to the disclosure may comprise obtaining and using size information, e.g. using size ratio.

In such an embodiment, the distance from the patterns to the image capture device and from the lens to the image capture device may be obtained by means of a telemeter, or by means of a ruler, or by means of a standard card or in any other appropriate manner.

In another embodiment encompassed by FIG. 19 where the first and second patterns 20 are known, the second set of data may be used for determining the relative positions (including orientation and location) between the smartphone 24 and the computer screen, i.e. the positions of the smartphone 24 and the screen of the computer 180 with respect to each other, by using ray-tracing and running an optimization algorithm. Then, if the position of the frame 140 is known, the at least one optical parameter of one of the lenses 30 (the lens the at least one optical parameter of which is to be retrieved), e.g. sphere and cylinder, may be retrieved from the first set of data by using ray-tracing and running an optimization algorithm.

If the source pattern (i.e. the first and second patterns 20) is not known, a picture of the first and second patterns 20 in front of the image capture device 26 may be taken with the image capture device 26 located at another position, in order to obtain an image of the first and second patterns 20, so that the source pattern will be known in the coordinate system of the image capture device 26.

In a particular embodiment, a picture of the first and second patterns together with a reference object (e.g. a credit card) might be captured.

As a variant, a picture of the first and second patterns might be captured with a camera with known focal length and pixel size, in addition with camera pattern distance information provided by a sensor (e.g. telemeter).

As another variant, a picture of the first and second patterns might be captured with a 3D camera.

In such an embodiment, the position of the frame 140 may be obtained in an automatic manner, by means of a frame holder or by means of a telemeter, or by means of a ruler, or in any other appropriate manner.

In still another embodiment encompassed by FIG. 19 where the first and second patterns 20 are known and where the frame 140 is also known:
  the second set of data may be used for determining the relative positions (including orientation and location)

between the smartphone 24 and the computer screen, i.e. the positions of the smartphone 24 and the screen of the computer 180 with respect to each other, by using ray-tracing and running an optimization algorithm;

some characteristic points of the frame 140 may be used for determining the position of the frame 140 (including orientation and location), by running an optimization algorithm in the same manner as for processing the second pattern;

the at least one optical parameter of one of the lenses 30 (the lens the at least one optical parameter of which is to be retrieved), e.g. sphere and cylinder, can be retrieved from the first set of data by using ray-tracing and running an optimization algorithm.

In such an embodiment, the frame 140 may be known in several manners:

by using the frame learning step described previously, for knowing the precise information of the frame, e.g. frame dimensions and/or characteristic points of the frame, because they are related to distance and orientation; or by using a database storing appropriate information about frames.

The frame learning step in such an embodiment is different from the frame learning step described in the embodiment involving a mobile device and a reflection device, where the frame learning step is used for knowing the shape of the frame. The frame learning step may comprise taking a picture of the frame together with a reference object (e.g. a credit card) in front of the image capture device.

As a variant, the frame learning step may comprise taking a picture the frame with a camera with known focal length and pixel size, in addition with camera frame distance information provided by a sensor (e.g. telemeter).

As another variant, the frame learning step may comprise taking a picture the frame with a 3D camera.

As described previously, the embodiments involving a reflection device make it possible to use only one device for both displaying the patterns and capturing images. Moreover, such embodiments make it possible to partially know the position of the frame by merely blocking the frame against the mirror.

For facilitating use of the system according to the disclosure by any user without wearing his/her eyeglasses, automatic assistance to the user, also referred to as "user guidance" in the present disclosure, may be provided, as described previously, as a non-limiting example, in relationship with the "frame learning" stage.

In an embodiment, for facilitating for a user the operation of obtaining an image of the source pattern, with the image capture device 26 taking a picture of the frame while holding the frame in contact with the reflection device 28, user-guidance may consist, as a non-limiting example, in:

displaying a third pattern (such as blue square, a logo or any other pattern deemed appropriate) as described previously so that the user position the smartphone 24 roughly, using the algorithms as described above, e.g. through an application running on the smartphone 24 to control the distance between the smartphone and the reflection device and ask the user to stop when the smartphone is at the right distance, using the algorithm as described above, e.g. through an application running on the smartphone 24, to put the source pattern at the optical center or display several certain patterns successively, and then take the required images.

In an embodiment, positioning the smartphone 24 comprises following steps:
step 1: orientation of the smartphone 24,
step 2: distance positioning of the smartphone 24,
step 3: adaptation of the brightness of the smartphone screen.

In addition, in that embodiment, eyeglasses positioning comprises following steps:
step 4: frame detection,
step 5: automatic photo capture.

Smartphone positioning and eyeglasses positioning steps are detailed below.

Step 1: Orientation of the Smartphone 24

For smartphone positioning, the user opens and runs an application available in the smartphone 24 while holding the smartphone 24 in front of a mirror with the smartphone screen facing the mirror.

Advantageously, the smartphone 24 has a predetermined tilt angle with respect to the mirror. This simplifies the user experience, as described below.

Figure 21:
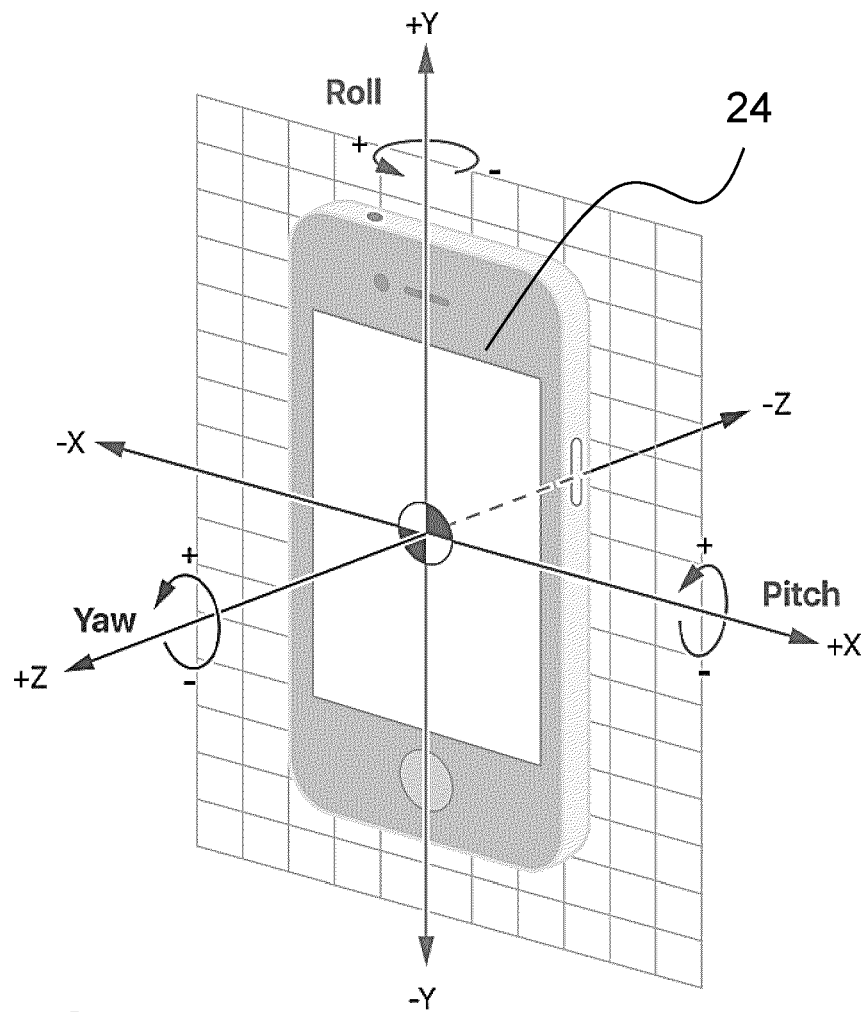
FIG. 21 illustrates the pitch, roll and yaw axes of a smartphone used in an embodiment of the method and system according to the present disclosure.

By way of non-limiting example, the smartphone gravitometer, which computes the earth's gravitational attraction on the three axes X, Y, Z, respectively pitch, roll and yaw axes of the smartphone 24 as shown in FIG. 21, may be used to that end.

Having a tilt angle amounts for the smartphone 24 to have a predetermined part of the earth's gravitational attraction on the yaw axis Z and the rest of the attraction on the roll axis. Thus, the smartphone 24 is oriented with respect to the mirror in such a manner that the upper part of the smartphone 24 is closer to the mirror than the lower part of the smartphone 24. In other words, the smartphone is tilted forward.

Figure 22:
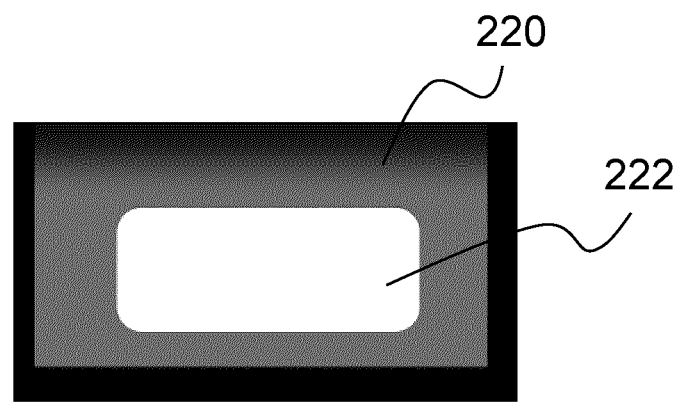
FIG. 22 illustrates a part of a smartphone screen used for smartphone positioning in an embodiment of the method and system according to the present disclosure.

In this embodiment, as shown in FIG. 22, a first fixed object 220, which, by way of non-limiting example, may have a first predetermined color, is displayed on the top part of the smartphone screen.

By way of non-limiting example, the first fixed object 220 may be a colored geometric shape, e.g. a blue rectangle.

In addition, a first moving object 222 of a second predetermined color different from the first color and having a size lower than or equal to the size of the first fixed object 220, is also displayed on the smartphone screen.

By way of non-limiting example, the first moving object 222 may be a geometric shape identical to the shape of the first fixed object 220, e.g. the first moving object 222 may be a white rectangle.

The first moving object 222 is moving according to the tilting of the smartphone 24. Having the first moving object 222 displayed inside the first fixed object 220, as shown in FIG. 22, means that the smartphone 24 is tilted forward.

As a variant, both first objects 220 and 222 could be moving with respect to each other, although this may be less ergonomic for the user.

Step 2: Distance Positioning of the Smartphone 24

For distance positioning, i.e. for ensuring that the smartphone 24 is at the right distance from the mirror, one or several distance positioning patterns 230 may be displayed at the bottom of the smartphone screen. If several distance positioning patterns 230 are displayed, e.g. two distance positioning patterns 230, they may be identical to each other.

Figure 23:
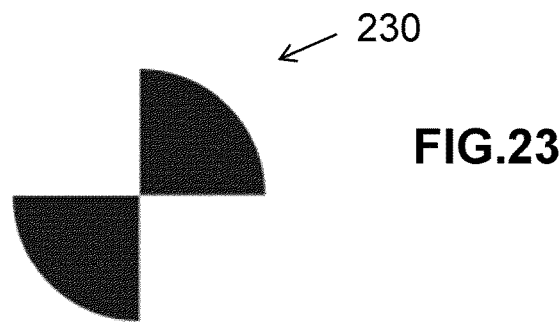
FIG. 23 illustrates a non-limiting example of a distance positioning pattern used for distance positioning of a smartphone in an embodiment of the method and system according to the present disclosure.

FIG. 23 shows a non-limiting example of a distance positioning pattern 230. Any of the distance positioning patterns 230 is detected for example by template matching, i.e. by determining whether the distance positioning pattern 230 matches with a template 240 that is for instance a smaller internal part of the distance positioning pattern 230.

Figure 24:
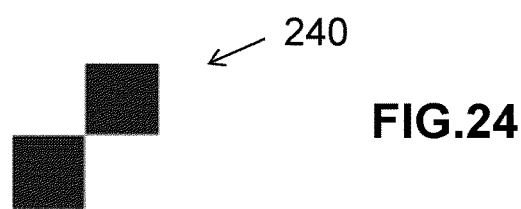
FIG. 24 illustrates a non-limiting example of a template used for distance positioning of a smartphone in an embodiment of the method and system according to the present disclosure.

FIG. 24 shows a non-limiting example of a template 240. The template matching process makes it possible to obtain the position of the center of the distance positioning patterns 230 and then track the smartphone 24 on the camera stream.

As the position of the distance positioning patterns 230 on the smartphone screen may be fixed independently of the smartphone type, that position will thus be known, which makes it possible to calculate the distance between two adjacent distance positioning patterns 230 at various distances from the mirror, so that the distance between the smartphone 24 and the mirror is known and it is known when the smartphone 24 is an appropriate distance from the mirror, e.g. 30 cm, for performing the subsequent steps of the method.

A message, such a mirrored character or character string, may be displayed on the smartphone screen in case the smartphone is too close to the mirror, in order to invite the user to move the smartphone backward.

Similarly, a message such as a mirrored character or character string may be displayed on the smartphone screen in case the smartphone is too far from the mirror, in order to invite the user to move the smartphone forward.

Step 3: Adaptation of the Brightness of the Smartphone Screen

Adapting the brightness of the smartphone screen may be useful, because the light environment may vary. To that end, the following steps may be implemented.

During a loop, the smartphone screen brightness is first increased by small steps until it reaches a maximum predetermined value and is then decreased similarly by small steps until it reaches a minimum predetermined value.

As soon as all the distance positioning patterns 230 are detected in one picture during the loop, the loop stops and the smartphone screen brightness is adjusted by small steps until the mean color of the matched template 240 is in the range [120; 140] in the grayscale color space [0; 255].

Figure 25:
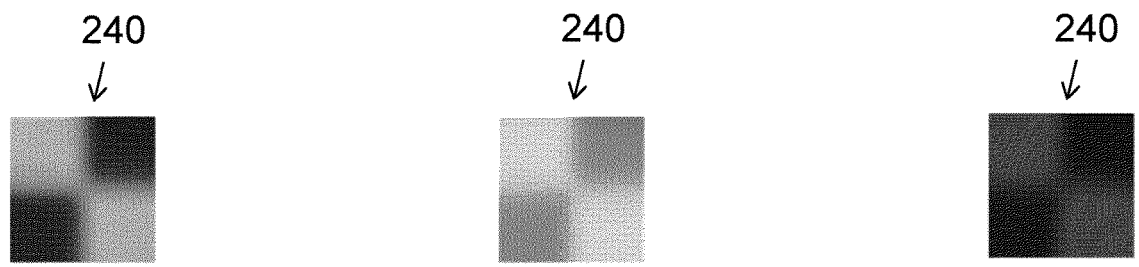
FIG. 25 illustrates a non-limiting example of three different levels of brightness of the template of FIG. 24, involved in a smartphone screen brightness adapting process, in an embodiment of the method and system according to the present disclosure.

FIG. 25 shows the brightness of the template 240 of FIG. 24 with, from left to right, three views showing a brightness that is respectively correct, too high and too low.

Thus, the user will see the smartphone screen alternate between bright and dark during the loop and, as soon as all the distance positioning patterns 230 are detected, a predetermined sign such as a "stop" sign will be displayed and/or voice guidance will invite the user to stop moving the smartphone.

At such time, the smartphone 24 is tilted optimally and positioned at the right distance and optimal brightness has been reached.

Step 4: Frame Detection

In an embodiment, for detecting the eyeglasses frame 140 in the camera stream, an object detection and recognition model based on a neural network is used in order to detect the lens 30 in the camera stream. By way of non-limiting example, a neural network of the Yolo v3-Tiny type may be used. The model is trained using a predetermined number of pictures of a frame against a mirror and pictures of a frame on a person's face.

The neural network returns the position and size, called Region Of Interest (ROI), of all the lenses it detects in the camera stream. For example, it may return at least two lenses, which correspond to the left and right lenses in the eyeglasses frame 140.

Figure 26:
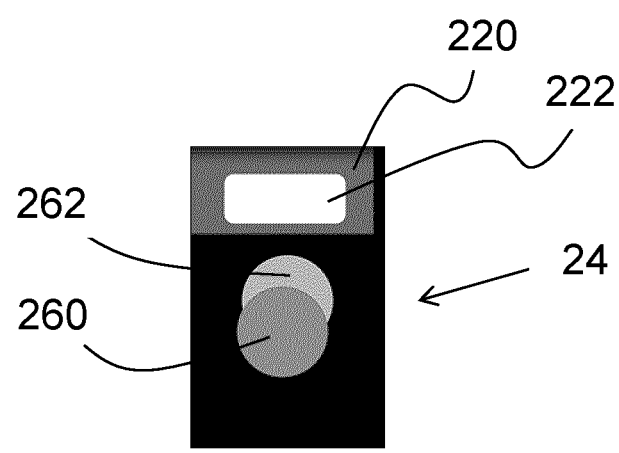
FIG. 26 illustrates a non-limiting example of user guidance for eyeglasses frame detection in an embodiment of the method and system according to the present disclosure.

FIG. 26 illustrates corresponding user guidance.

As shown in FIG. 26, a second fixed object 260, which, by way of non-limiting example, may have a first predetermined color, is displayed at the center of the smartphone screen. It represents the center of the upper part of the smartphone screen in the camera stream.

By way of non-limiting example, the second fixed object 260 may be a colored geometric shape, e.g. a red circle.

In addition, a second moving object 262 of a second predetermined color different from the first color and having a shape and size equal to the shape and size of the first fixed object 260, is also displayed on the smartphone screen. It represents the lens 30 of which at least one optical parameter is to be retrieved by the method and system according to the present disclosure.

By way of non-limiting example, if the second fixed object 260 is a red circle, the second moving object 262 may be a green circle.

The user is invited to move the smartphone 24 so that the second moving object 262 matches the second fixed object 260, which means that the frame 140 and the smartphone 24 are correctly positioned.

As a variant, both second objects 260 and 262 could be moving with respect to each other, although this may be less ergonomic for the user.

Step 5: Automatic Photo Capture

When the second moving object 262 matches the second fixed object 260, a predetermined object or message is displayed on the smartphone screen, so that the user knows that the frame 140 and smartphone 24 should not be moved. By way of non-limiting example, as a predetermined object, a white circle on a green background may be displayed.

At that time, pictures are automatically taken by the camera of the smartphone 24 for processing according to the present disclosure in order to retrieve the at least one optical parameter of the lens 30.

A variant of the step of obtaining of a rough estimate of the at least one parameter is described below, in a particular embodiment where the at least one parameter is the lens power.

In that variant, the three following steps, detailed hereafter, are carried out:

Step A: estimation of the distance between a target and the smartphone camera

Step B: estimation of horizontal, vertical and diagonal magnifications

Step C: estimation of the lens power based on the estimation obtained at step A and the estimations obtained at step B Step A: Estimation of the Distance Between a Target and the Smartphone Camera calibration data are provided as an input; matching points are determined between a target, e.g. the pattern 20 displayed on the smartphone screen (the object), and the pattern 20 in the mirror (the image). By way of non-limiting example, the pattern 20 used for this step may be a QR code displayed in the bottom part of the smartphone screen as in FIG. 18;

the relative positions of the smartphone 24 and the mirror and thus, the estimated distance d between the target and the camera, are determined through an optimization process, using the distance denoted Tz between the smartphone 24 and the mirror, as well as the orientation of the smartphone 24 defined by its rotation by a pitch angle Rx and by a roll angle Ry, referring to the pitch and roll axes X, Y shown in FIG. 21.

Step B: Estimation of Horizontal, Vertical and Diagonal Magnifications

It is noted that, in this variant, the relative positions of the camera, the lens and the pattern 20 are not used in this step, as detailed below.

By using the part of the pattern 20 that is seen by the camera only i.e. outside the lens 30 (for example the QR code of FIG. 18) and considering that the vertical direction is defined by the roll axis Y of the smartphone 24 as shown in FIG. 21, three magnifications between the above-mentioned object and image are determined for the camera:
- the horizontal magnification for the camera, denoted MCh;
- the vertical magnification for the camera, denoted MCv; and
- the diagonal magnification for the camera, denoted MCd, that is defined in one of the two diagonal directions i.e. at an angle of 45° between the pitch and roll axes X, Y.

Then, by using the part of the pattern 20 that is seen by the camera through the lens 30 (for example the circular target of FIG. 17) and considering that the vertical direction is defined by the roll axis Y of the smartphone 24 as shown in FIG. 21, three magnifications between the above-mentioned object and image are determined for the assembly consisting of the camera and the lens 30:
- the horizontal magnification for the camera+lens assembly, denoted MLCh;
- the vertical magnification for the camera+lens assembly, denoted MLCv; and
- the diagonal magnification for the camera+lens assembly, denoted MLCd, that is defined in one of the two diagonal directions i.e. at an angle of 45° between the pitch and roll axes X, Y.

Then, the horizontal, vertical and diagonal magnifications for the lens 30, respectively denoted Mh, Mv and Md, are extracted as follows:

$$Mh=MLCh/MCh$$

$$Mv=MLCv/MCv$$

$$Md=MLCd/MCd$$

Step C: Estimation of the Lens Power Based on the Estimation Obtained at Step a and the Estimations Obtained at Step B By using the estimated distance d obtained at step A and the magnifications Mh, Mv and Md obtained at step B, the lens power in the horizontal direction, denoted Power_h, the lens power in the vertical direction, denoted Power_v and the lens power in the diagonal direction, denoted Power_d are determined as follows:

$$Power\_h=(Mh-1)/(Mh\times d)$$

$$Power\_v=(Mv-1)/(Mv\times d)$$

$$Power\_d=(Md-1)/(Md\times d)$$

Figure 27:
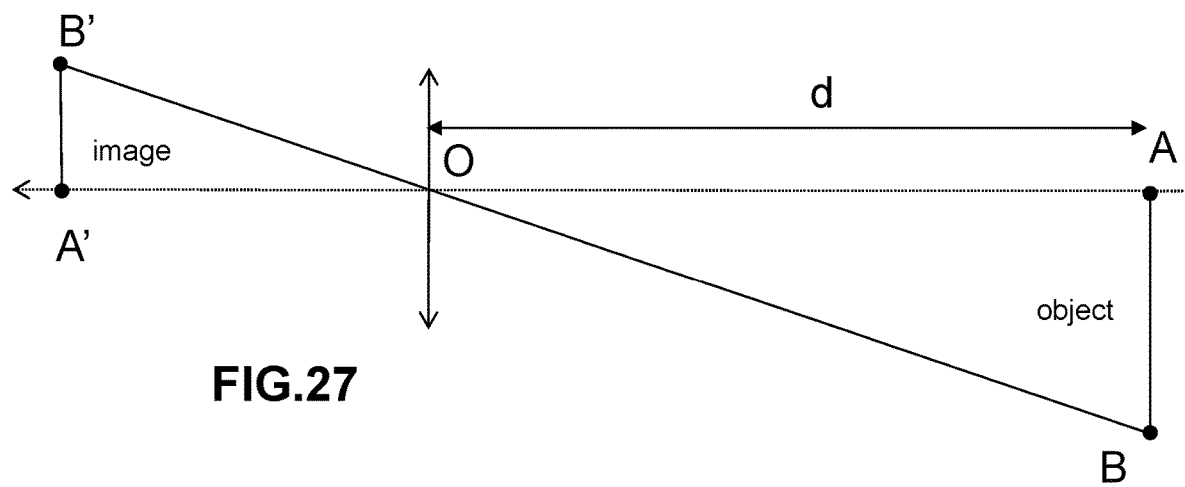
FIG. 27 is a graph illustrating lens power calculation in an embodiment of the method and system according to the present disclosure.

In more detail, the above formulas are obtained as follows, referring to FIG. 27.

Magnifications M are defined as A'B'/AB=OA'/OA.

The power P is defined as (1/OA')−(1/OA).

Thus, OA'=(1/(P+(1/OA))), which gives OA'/OA=(1/(P.OA+1)).

As OA=−d, M=1/(1−d.P).

As a result, P=(M−1)/(M.d).

If the lens 30 is a progressive lens, the lens 30 will have to be sufficiently covered by the source pattern in order to retrieve the complete power distribution. Moreover, it is necessary to know where the powers are measured. In order to obtain information about the position within the lens, there are two options:

- either detect the permanent markings on the lens, so that the power distribution is known in the coordinate system Rlens of the lens (several known techniques are available in this respect);
- or detect the position of the user's eyes within the frame (known tools are available in this respect), so that the power distribution is known in the coordinate system of the user's face.

For both options, at least one additional acquisition may be needed in order to retrieve the new coordinate system that is to be taken as a reference. For example, in the second option, a selfie made by the user may be used.

At least some of the steps of the various embodiments of the method described above may be executed by a processor, in the form of one or more sequences of instructions of a computer program product accessible to the processor.

The one or more sequences of instructions may be stored in a non-transitory storage medium.

The processor and/or the non-transitory storage medium may be part of a computer device which may be comprised partially or totally in the above-mentioned system.

The method for retrieving at least one optical parameter of an ophthalmic lens as described above may be used for manufacturing a duplicate of the lens.

Although representative methods, systems, products and devices have been described in detail herein, those skilled in the art will recognize that various substitutions and modifications may be made without departing from the scope of what is described and defined by the appended claims.

The invention claimed is:

1. A method for retrieving at least one optical parameter of an ophthalmic lens, comprising:
    obtaining an image of a first and second patterns at a same time by using an image capture device located at a first position, the image including both the first and second patterns with the second pattern being entirely uncovered by the lens, the first and second patterns being different;
    from said image, obtaining a first set of data from at least a part of said first pattern that is seen by said image capture device through said lens;
    from said image, obtaining a second set of data from at least a part of said second pattern that is seen by said image capture device outside said lens; and
    retrieving said at least one optical parameter by using said first and second sets of data and taking account of positions, with respect to each other, of said image capture device, said lens and said first and second patterns.

2. The method according to claim 1, wherein said retrieving comprises obtaining said positions, with respect to each other, of said image capture device, said lens and said first and second patterns, by using said second set of data.

3. The method according to claim 1, wherein said retrieving further comprises:
    obtaining a rough estimate of said at least one parameter, by using said first set of data and said positions, with respect to each other, of said image capture device, said lens and said first and second patterns;
    obtaining a refined estimate of said at least one optical parameter, by using said first set of data and said positions, with respect to each other, of said image capture device, said lens and said first and second patterns and by applying an optimization technique based on minimizing a cost function, a value of said cost function being determined by using ray tracing.

4. The method according to claim 1, wherein said retrieving further comprises obtaining a rough estimate of said at least one parameter, by:
- estimating a distance between said image capture device and at least a part of said second pattern that is seen by said image capture device outside said lens;
- estimating magnifications in horizontal, vertical and diagonal directions between an object and an optical image of said object;
- retrieving said at least one optical parameter by using said estimated distance and said estimated magnifications.

5. The method according to claim 1, wherein said obtaining said image of said first pattern comprises reflecting by a reflection device the first pattern before the first pattern is seen by said image capture device through said lens and said obtaining said image of said second pattern comprises reflecting by said reflection device the second pattern before the second pattern is seen by said image capture device outside said lens.

6. The method according to claim 1, wherein said lens is mounted on a frame, and wherein the method further comprises detecting a position of said frame and deducing therefrom a cylinder axis of said lens.

7. The method according to claim 6, wherein said detecting comprises obtaining an image of said frame by using said image capture device located at a second position.

8. The method according to claim 1, wherein said first and second patterns are unknown, and wherein the method further comprises obtaining an image of said first and second patterns, by using said image capture device located at a further position.

9. The method according to claim 5, wherein said obtaining said images of said first and second patterns comprises:
- positioning said frame against said reflection device so that a front surface of said lens is tangent to said reflection device at a contacting point;
- orienting said first and second patterns towards said lens; and
- orienting said image capture device towards said lens.

10. The method according to claim 9, wherein said first and second patterns are displayed on a screen of a mobile device equipped with said image capture device, wherein:
- said orienting steps comprise tilting said mobile device by a predetermined tilt angle with respect to said reflection device;
- said obtaining said images of said first and second patterns further comprises:
- determining a distance between said screen and said reflection device by displaying on said screen at least one distance positioning pattern and moving said mobile device forward or backward with respect to said reflection device until said distance reaches a predetermined value;
- adapting a brightness of said screen by repeatedly increasing and decreasing said brightness between a maximum predetermined value and a minimum predetermined value, until said at least one distance positioning pattern is detected in a stream of said image capture device;
- detecting said ophthalmic lens in said stream by using a neural network; and
- automatically capturing, by said image capture device, said images of said first and second patterns as soon as said orienting, distance determining, brightness adapting and lens detecting steps have been completed.

11. The method according to claim 6, wherein said detecting said position of said frame comprises applying an optimization technique based on minimizing a cost function, a value of said cost function being determined by using ray tracing.

12. The method according to claim 1, wherein the method further comprises determining an optical center of said lens based on said image of said first pattern.

13. A system for retrieving at least one parameter of an ophthalmic lens, comprising:
- at least one processor;
- a mobile device equipped with an image capture device; and
- a reflection device or a computer,
- wherein the at least one processor is configured to:
- obtain an image of a first and second patterns at a same time by using the image capture device located at a first position, the image including both the first and second patterns with the second pattern being entirely uncovered by the lens, the first and second patterns being different,
- obtain, from said image, a first set of data from at least a part of said first pattern that is seen by said image capture device through said lens,
- obtain, from said image, a second set of data from at least a part of said second pattern that is seen by said image capture device outside said lens, and
- retrieve said at least one optical parameter by using said first and second sets of data and taking account of positions, with respect to each other, of said image capture device, said lens and said first and second patterns.

14. A non-transitory storage medium having stored thereon one or more sequences of instructions that when executed by a processor, cause said processor to implement a method for retrieving at least one optical parameter of an ophthalmic lens, the method comprising:
- obtaining an image of a first and second patterns at a same time by using an image capture device located at a first position, the image including both the first and second patterns with the second pattern being entirely uncovered by the lens, the first and second patterns being different;
- obtaining, from said image, a first set of data from at least a part of said first pattern that is seen by said image capture device through said lens;
- obtaining, from said image, a second set of data from at least a part of said second pattern that is seen by said image capture device outside said lens; and
- retrieving said at least one optical parameter by using said first and second sets of data and taking account of positions, with respect to each other, of said image capture device, said lens and said first and second patterns.

* * * * *